US011307741B2

(12) United States Patent
Malik

(10) Patent No.: US 11,307,741 B2
(45) Date of Patent: Apr. 19, 2022

(54) DOCUMENT READER PLATFORM

(71) Applicant: Icarus Lived Inc., New York, NY (US)

(72) Inventor: John Irfan Malik, New York, NY (US)

(73) Assignee: Icarus Lived Inc., New York, NY (US)

( * ) Notice: Subject to any disclaimer, the term of this patent is extended or adjusted under 35 U.S.C. 154(b) by 100 days.

(21) Appl. No.: 16/886,064

(22) Filed: May 28, 2020

(65) Prior Publication Data

US 2021/0373727 A1    Dec. 2, 2021

(51) Int. Cl.
| G06F 3/0484 | (2013.01) |
| G06F 3/0482 | (2013.01) |
| G06F 16/93 | (2019.01) |
| G06F 40/14 | (2020.01) |
| G06F 16/23 | (2019.01) |
| G06F 16/22 | (2019.01) |
| G06F 40/186 | (2020.01) |

(52) U.S. Cl.
CPC .......... G06F 3/0484 (2013.01); G06F 3/0482 (2013.01); G06F 16/2246 (2019.01); G06F 16/2379 (2019.01); G06F 16/93 (2019.01); G06F 40/14 (2020.01); G06F 40/186 (2020.01)

(58) Field of Classification Search
CPC .. G06F 3/0484; G06F 3/0482; G06F 16/2246; G06F 16/2379; G06F 16/93; G06F 40/14; G06F 40/186
See application file for complete search history.

(56) References Cited

U.S. PATENT DOCUMENTS

| 6,385,619 B1 * | 5/2002 | Eichstaedt | .......... G06F 16/9535 707/748 |
| 2007/0156677 A1 * | 7/2007 | Szabo | ................. G06F 16/2457 |
| 2016/0344828 A1 * | 11/2016 | Hausler | ................... H04L 67/42 |

* cited by examiner

*Primary Examiner* — Jennifer N Welch
*Assistant Examiner* — Ashley M Fortino
(74) *Attorney, Agent, or Firm* — Schwegman Lundberg & Woessner, P.A.

(57) ABSTRACT

A reader platform system generates a display of a document that is formed based on a tree structure from a structured document template with an idea type attribute and content of a supporting idea type attribute that is based on the idea type attribute. The idea type attribute and the content of the supporting idea type attribute are validated based on taxonomy rules for the structured document template. The reader platform system receives a reader feedback of the document via a feedback user interface of the display. The profile of a reader of the document and the profile of an author of the document are updated based on the reader feedback. The feed of another reader related to the reader of the document is updated based on the updated profile of the reader of the document.

16 Claims, 19 Drawing Sheets

DOCUMENT READER PLATFORM

TECHNICAL FIELD

The subject matter disclosed herein generally relates to a special-purpose machine that provides a platform for generating personal recommendation of documents, including computerized variants of such special-purpose machines and improvements to such variants. Specifically, the present disclosure addresses systems and methods that provide a web-based application for viewing a personalized feed based on user feedback on sections of a document using a logical tree structure and taxonomy rules.

BACKGROUND

Productivity applications can include tools for producing content, such as creating and editing content within different types of documents such as word processing documents, spreadsheets, and presentations. In some cases, productivity applications include content authoring applications.

Finding trustworthy information on the internet is difficult because sources and bias are not always disclosed or can be hidden from the reader. There is also no consensus mechanism for understanding how trustworthy and believable that information is globally at internet scale.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
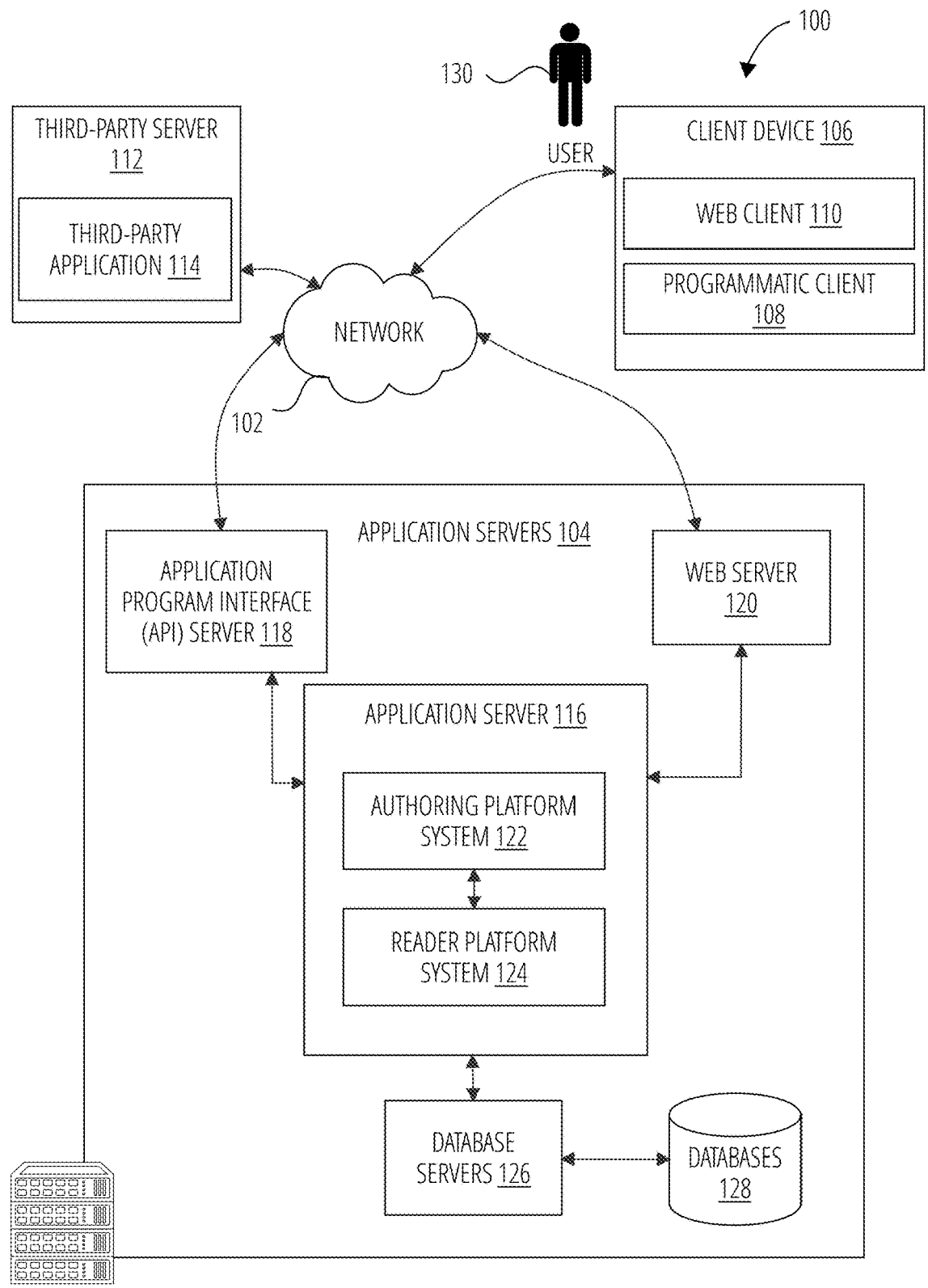
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The presently described document reader platform (also referred to as the reader platform, the reader system, the reader platform system) enables a user to view and read content (from documents/articles) that contain ideas and supporting content using taxonomy rules for the types of ideas and rules for supporting content. In one example, the reader platform enables a user (e.g., a reader) to read/view an article written by another user (e.g., an author) that used an authoring platform system (also referred to as the author platform, the authoring system, the author platform system) to write the document. In one example, the author platform provides a process flow that enables the author to provide the idea content and supporting content using a structured template in a web-based application. The structured template validates the idea content and supporting content based on the taxonomy and content rules.

The reader platform displays a content of an article and metrics that indicate shared or common values/ideas between the reader and the author. For example, the reader platform calculates and displays a percentage of shared ideas (e.g., mind alignment) between the reader and the author. In another example, the reader platform calculates and displays a percentage of "reasons" already believed by the reader relative to the reasons/content set forth in the article. A "reason" is referred to as logical support for an idea that describes how or why, and helps the idea make sense to the reader.

In another example, the reader platform includes a document feedback user interface that receives a document feedback from the reader to indicate whether the reader believes or agrees with the document/article. The reader platform updates the percentage of shared ideas between the reader and the author based on the received document feedback. In another example, the reader platform updates includes a supporting content feedback user interface that receives a supporting content feedback from the reader to indicate whether the reader believes or agrees with supporting content in the document/article. The reader platform updates the percentage of reasons already believed by the reader based on the received supporting content feedback. In another example, the reader platform identifies users of the reader platform that share ideas based on the percentage of shared ideas between the reader and other readers. The reader platform provides a suggestion to read articles/documents authored by the identified readers.

In one example embodiment, a reader platform system generates a display of a document that is formed based on a tree structure from a structured document template with an idea type attribute and content of a supporting idea type attribute that is based on the idea type attribute. The idea type attribute and the content of the supporting idea type attribute are validated based on taxonomy rules for the structured document template. The reader platform system receives a reader feedback of the document via a feedback user interface of the display. The profile of a reader of the document and the profile of an author of the document are updated based on the reader feedback. The reader platform system is then able to surface relevant documents to the reader based on the updated reader profile.

As a result, one or more of the methodologies described herein facilitate solving the technical problem of identifying consensus of ideas set forth in logically structured and rule-validated documents. As such, one or more of the methodologies described herein may obviate a need for certain efforts or computing resources that otherwise would be involved in running limited and simple tools such as spelling and grammar check, and manual search of documents to a user. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed.

One or more application servers 104 provide server-side functionality via a network 102 to a networked user device, in the form of a client device 106. A web client 110 (e.g., a browser) and/or a programmatic client 108 (e.g., an "app") are hosted and execute on the client device 106.

An Application Program Interface (API) server 118 and a web server 120 provide respective programmatic and web interfaces to application servers 104. A specific application server 116 hosts an authoring platform system 122 and a reader platform system 124, each including components, modules and/or applications.

The authoring platform system 122 comprises an application that enables a user 130 of the client device 106 to author and edit content in a document using a structured template. The document can be published, stored at application servers 104, and shared with other users. In one example embodiment, the authoring platform system 122 includes a web-based application hosted on the application server 116 and accessible by the web client 110 via the web server 120. In another example, the authoring platform system 122 includes a server-based application hosted on the application server 116 and accessible by the web client 110 via the Application Program Interface (API) server 118. The authoring platform system 122 receives content for the structured template from the client device 106. In one example embodiment, the authoring platform system 122 provides a choice of several types of content (e.g., idea types) and receives a selection of a type of content from the client device 106. The authoring platform system 122 further receives content related to the selection of the type of content and validates the received content against taxonomy rules and content rules stored at the application server 116. The authoring platform system 122 generates a tree structure based on the content and selected types of content. The authoring platform system 122 uses the tree structure to generate a document for publication and sharing. An example embodiment of the authoring platform system 122 is described further below with respect to FIG. 2.

The reader platform system 124 enables the user 130 to view and read documents published using the authoring platform system 122. The published document includes ideas and supporting content organized in a logical structure based on the tree structure. The reader platform system 124 displays content of a published article and metrics that indicate shared or common values/ideas between the reader and the author. For example, the reader platform system 124 calculates and displays a percentage of shared ideas (e.g., mind alignment) between the reader and the author. In another example, the reader platform system 124 calculates and displays a percentage of reasons already believed by the reader relative to the reasons/content set forth in the article. In another example, the reader platform system 124 receives an indication from a user/reader that he/she believes an idea set forth in an article. The believed idea is stored in a profile (e.g., a user's mind) of the user/reader. The believed ideas (from the user's mind) are then shown/suggested/promoted to other users in their feeds. In particular, other users with a higher percentage of shared ideas will likely see these indicated believed ideas in their feeds.

In another example, the reader platform system 124 includes a document feedback user interface that receives a document feedback from the reader to indicate whether the reader believes or agrees with the document/article. The reader platform system 124 updates the percentage of shared ideas between the reader and the author based on the received document feedback. In another example, the reader platform system 124 updates includes a supporting content feedback user interface that receives a supporting content feedback from the reader to indicate whether the reader believes or agrees with supporting content in the document/article. The reader platform system 124 updates the percentage of reasons already believed by the reader based on the received supporting content feedback. In another example, the reader platform system 124 identifies users of the reader platform that share ideas based on the percentage of shared ideas between the reader and other readers. The reader platform system 124 provides a suggestion to read articles/documents authored by the identified readers. An example embodiment of the reader platform system 124 is described further below with respect to FIG. 4.

The web client 110 communicates with the authoring platform system 122 and the reader platform system 124 via the web interface supported by the web server 120. Similarly, the programmatic client 108 communicates with the authoring platform system 122 and reader platform system 124 via the programmatic interface provided by the Application Program Interface (API) server 118. The third-party application 114 may include, for example, a social network application, a document collaboration application, or any other software platform that enable sharing of information and documents between users.

The application server 116 is shown to be communicatively coupled to database servers 126 that facilitates access to an information storage repository or databases 128. In an example embodiment, the databases 128 includes storage devices that store documents to be published and/or processed by the authoring platform system 122 and the reader platform system 124.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 19, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some components or functions of the network environment 100 may be combined or located elsewhere in the network environment 100. For example, some of the functions of the client device 106 may be embodied at the application server 116.

Figure 2:
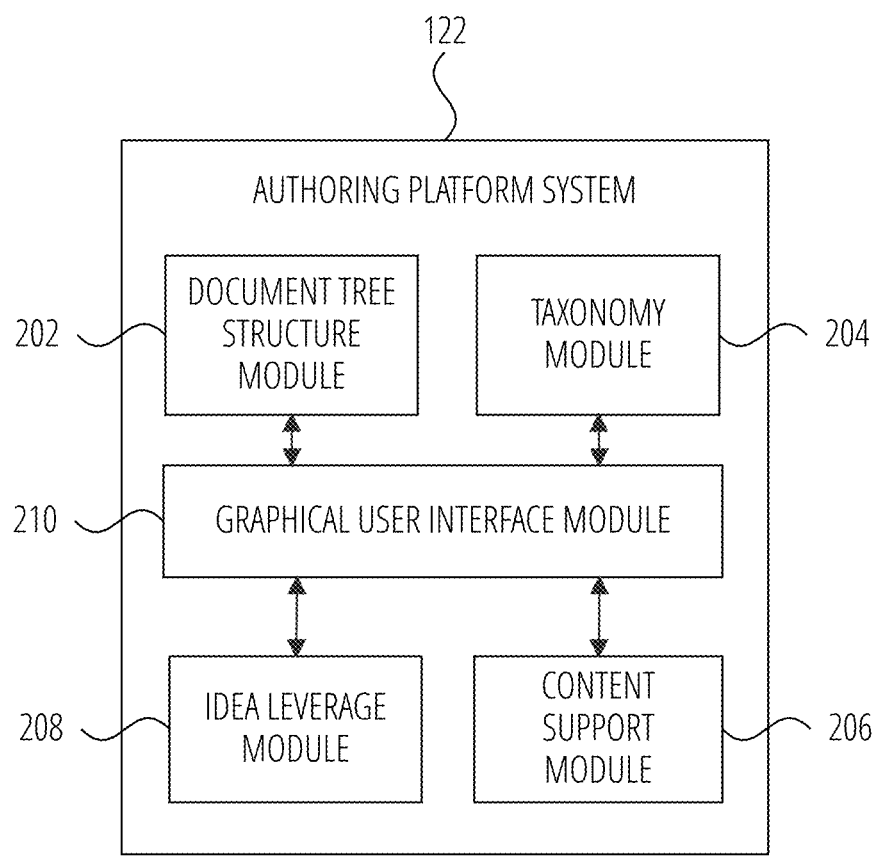
FIG. 2 illustrates an authoring platform system in accordance with one example embodiment.

FIG. 2 illustrates an authoring platform system 122 in accordance with one example embodiment. The authoring platform system 122 comprises a document tree structure module 202, a taxonomy module 204, a content support module 206, an idea leverage module 208, and a graphical user interface module 210.

The document tree structure module 202 generates a structured document template that allows the user 130 to input data. The structure document template comprises, for example, a title, an idea, an idea type (e.g., opinion, principle, fact, meaning, personal experience, hypothetical example), a supporting idea type (e.g., opinion, principle, fact, meaning, personal experience, hypothetical example), and content assigned to the selected supporting idea type field. Those of ordinary skills in the art will recognize that the above listed types of ideas or supporting ideas are not limited to the above examples. For example, support can be in the form of (i) a reason, (ii) an example, or (iii) context. The document tree structure module 202 generates a tree structure based on the content of the corresponding selected idea type and the selected supporting idea type attributes. For example, the idea types are for the "nodes", but the support types are the "edges."

In one example, the structured document template comprise fields corresponding to the title, idea, idea types, and supporting idea types. The user 130 inputs content corresponding to fields selected by the user in the structured document template. The fields may be associated with corresponding attributes of the structured document template. In one example process flow, the user 130 first inputs a title in a title field of the structured document template, and then selects an idea type in the structured document template. The structured document template dynamically updates the list of attributes related to the types of supporting ideas based on the selected idea type. The structured document template then presents the updated list of attributes and indicates which attributes are required based on the selected idea type. In another example embodiment, the document tree structure module 202 generates a document for publication based on the content in the selected attributes and fields, and a tree structure of the document.

The taxonomy module 204 uses predefined types of attributes (e.g., idea types) and predefined content rules (e.g., supporting idea rules) to validate content in the structured document template. For example, when the user 130 selects an opinion as an idea type, the structured document template indicates the types of supporting ideas (e.g., opinion and principle) that are required based on the selected opinion idea type. An example embodiment of the taxonomy module 204 is further described below with respect to FIG. 3.

The content support module 206 operates the fields related to the supporting ideas attributes. For example, the fields include user-provided content (e.g., user can type in text to express their opinion/principle), factual content (e.g., user provides a citation to a journal), and keywords related to the user-provided content.

Figure 14:
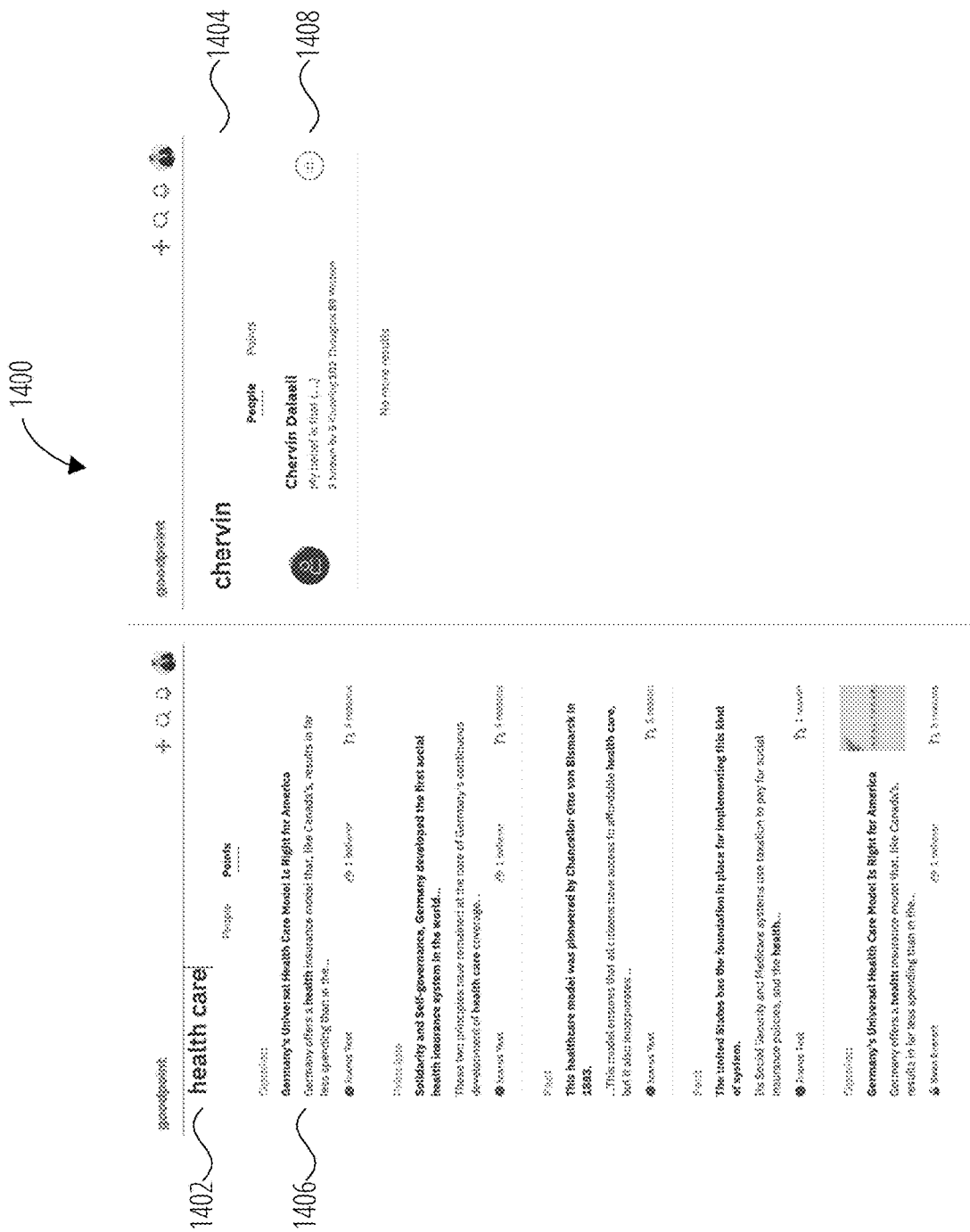
FIG. 14 illustrates a screenshot of a reader platform system in accordance with one example embodiment.

The idea leverage module 208 enables the user 130 to search existing content (of supporting ideas attributes) from other documents previously generated using the authoring platform system 122. As such, the user 130 can leverage and incorporate existing content of supporting ideas attributes into the present document. In one example embodiment, the idea leverage module 208 receives a search query in a supporting idea search field. The idea leverage module 208 provides search results based on the search query. The user 130 selects one of the search results. The idea leverage module 208 adds content from the selected search result into the supporting idea attribute of the present document. In another example embodiment, the idea leverage module 208 retrieves ideas indicated as believed by the reader from a profile of the reader (e.g., a mind profile). The idea leverage module 208 suggests leveraging the believed ideas to form a new idea. For example, the reader uses the idea leverage module 208 to select two or more believed ideas (from the mind profile of the reader) to generate/form a new idea based on the two or more believed ideas. In another example embodiment, the idea leverage module 208 enables the reader to search keywords for possible reading ideas. For example, the reader can search for a term such as "health care." In response, the idea leverage module 208 returns all the facts and opinions with the highest belief consensus counts related to "health care." The facts and opinions may include the term "health care." FIG. 14 illustrates an example of a reader search user interface.

The graphical user interface module 210 generates a graphical user interface that illustrates a combination of the tree structure, a reader view, and an editor view. The tree structure is based on the logical structure and elements of the selected supporting idea attributes and types. Changes to the tree structure result in changes to the generated document. Furthermore, changes to the content using the editor view reflect changes to the tree structure and the generated document. In one example, the graphical user interface module 210 generates a single pane that illustrates the editor view. In another example, the graphical user interface module 210 generates a first pane illustrating the tree structure, a second pane illustrating the reader view, and a third pane illustrate the editor view.

Figure 3:
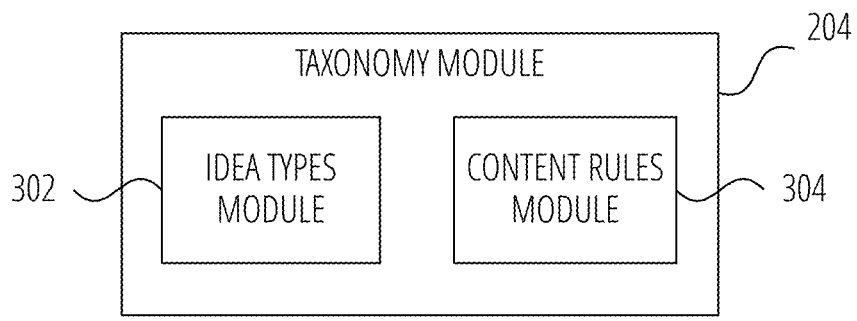
FIG. 3 illustrates a taxonomy module in accordance with one example embodiment.

FIG. 3 illustrates a taxonomy module 204 in accordance with one example embodiment. The taxonomy module 204 comprises an idea types module 302, and a content rules module 304. The idea types module 302 defines the types of ideas available for selection: opinion, principle, fact, meaning, personal experience, hypothetical example. Those of ordinary skills in the art will recognize that the above listed types of ideas are, for illustration purposes, and not limited to the above examples. Other types of ideas or categorization of ideas may be used.

The content rules module 304 defines rules related to content that support the selected types of ideas. For example, the following illustrates an example of content rules logic:
Idea Types:
Opinion
Principle
Fact
Meaning
Personal Experience ("PE")
Hypothetical Example ("HE")
Fundamental Belief Types (also referred to as "fundamental values"):
Belief System
Principle-value
Fact-value
Rules for Saving/Publishing:
To save or publish any ideas to the network, the required fields must be satisfied.
Example rules for "complete thinking;" if thinking is not complete:
1. An incomplete thinking indicator is displayed.
2. The idea is not believable or reusable by anyone else.

The content rules module 304 validates selected types of support ideas. In other words, actions that are not permitted are not presented by authoring platform system 122. For example, the authoring platform system 122 does not show the option to add an opinion if it is not permitted as support. The following illustrates examples of rules:
Opinions can only be supported by:
Opinions
Principles
Facts
Meaning
Personal Experiences
Hypothetical Examples
Principles can only be supported:
Principles
Facts
Belief systems
Principle-values
Meaning
Personal Experiences
Hypothetical Examples
Facts can only be supported by:
Facts
Belief systems
Fact-values
Meaning
Personal Experiences
Hypothetical Examples
No other idea-types can have support.

Those of ordinary skills in the art will recognize that the content rules module 304 is not limited to the example rules listed above; other rules can be used in the content rules module 304. Furthermore, the present application is not limited to the above terminology. Other terminology of content rules and content types may be used. For example, the term "grounding truth", "conceptual idea", "belief idea/system" may be used to describe "foundational values."

Figure 4:
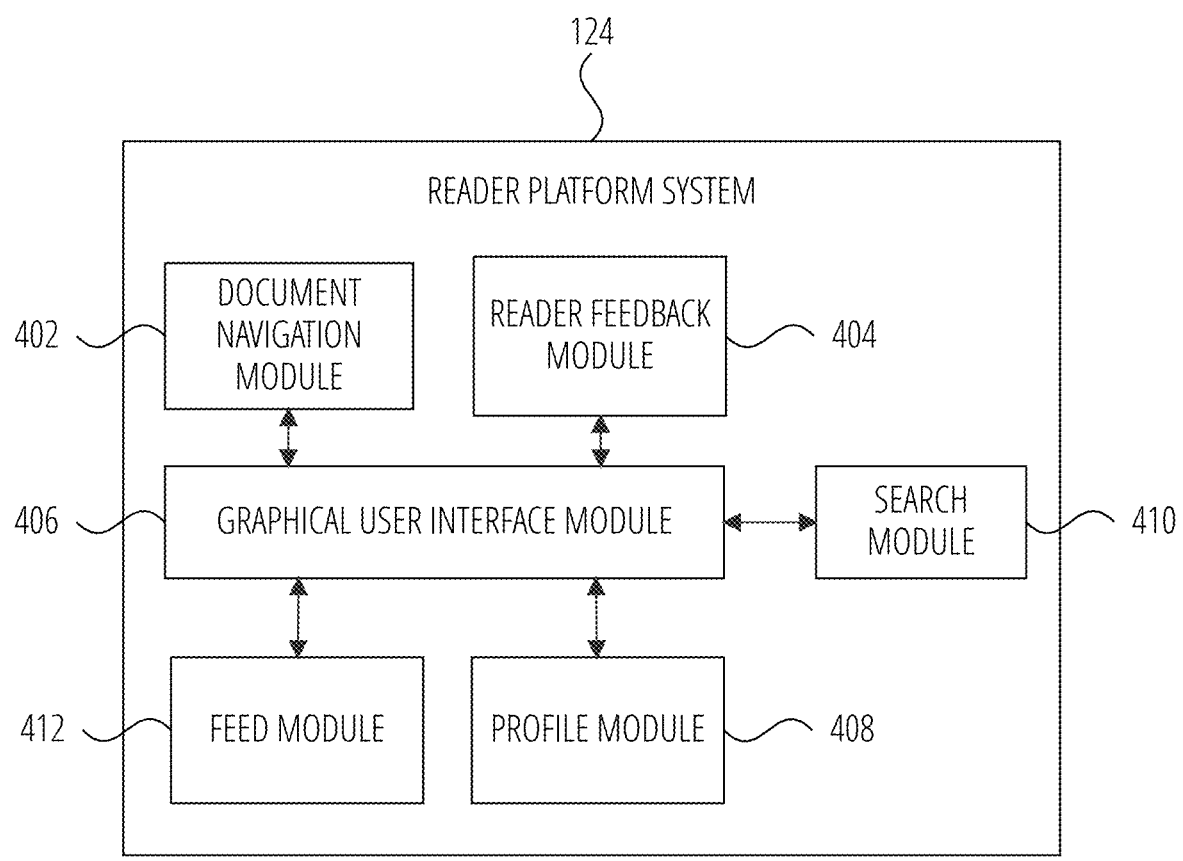
FIG. 4 illustrates a reader platform system in accordance with one example embodiment.

FIG. 4 illustrates a reader platform system 124 in accordance with one example embodiment. The reader platform system 124 comprises a document navigation module 402, a reader feedback module 404, a graphical user interface module 406, a feed module 412, a profile module 408, and a search module 410.

The document navigation module 402 displays the document and enables the user to further navigate within the document by expanding contents within each branch of the tree structure represented by the document. For example, the user 130 may click on a section of the document or a subtitle of the document to expand the section of the document and provide further supporting content associated with the section of the document. Example of the tree structure of a document is further illustrated below with respect to FIG. 15.

The reader feedback module 404 includes user interface elements that enable the reader to provide feedback related to the document. For example, the reader feedback module 404 generates a document feedback user interface element that allows the reader to indicate whether the reader believes or agrees, in general, with the content in the document. In one example, the document feedback user interface element is in the form of a "believe" clickable button. The reader clicks the button to toggle between a first state (e.g., believe/agree) and a second state (e.g., forget/not believe/disagree).

Clicking the "Believe" button has the following impact: the reader indicates that he/she believes the idea set forth in the document, stores the idea in a profile of the reader (e.g., also referred to as Reader's Mind), and then places the idea in a document feed for anyone who knows that reader. For example, if Sean Everett knows (follows) Mike Bloomberg, and Mike Bloomberg believes the idea "We Need to Implement Red Flag Laws", then that idea will show up in Sean Everett's personalized feed and show Mike Bloomberg as the idea's "Featured Believer."

In another example, the reader feedback module 404 generates a supporting content user interface element that allows the reader to indicate whether the reader believes or agrees with the supporting content set forth in the document. In one example, the supporting content user interface element is in the form of a clickable button at the end of each supporting content in the document. The reader clicks the button to toggle between a first state (e.g., believe/agree) and a second state (e.g., forget/not believe/disagree) to indicate approval/disapproval of the corresponding supporting content.

The graphical user interface module 406 generates a graphical user interface that displays the document and the user interface elements from reader feedback module 404. In one example, the graphical user interface module 406 further displays metrics related to a profile of the reader and the author of the document.

The profile module 408 computes metrics based on a profile of the reader and a profile of the author. For example, the metrics may be based on the user feedback from the reader in response to reading the document of the author. Examples of computation metrics are illustrated further below with respect to FIG. 5.

The search module 410 enables a reader to find similar or dissimilar people based on mind alignment and/or learn about a topic based upon the highest consensus ideas related to it. FIG. 14 illustrates an example of a search module interface. The reader can search by topics/ideas (e.g., points) or by people.

The feed module 412 identifies users based on the metrics. For example, the feed module 412 recommends article written or read by other users that share similar ideas (e.g., high % of shared ideas). In one example, the feed module 412 identifies other users of the reader platform system 124 based on the first metric (of each other user and the reader) exceeding a preset threshold. The feed module 412 identifies articles/document read/authored by the identified users and recommends them to the reader. In another example, the feed module 412 recommends the reader to "follow" the identified users or read articles authored by the identified users.

Figure 5:
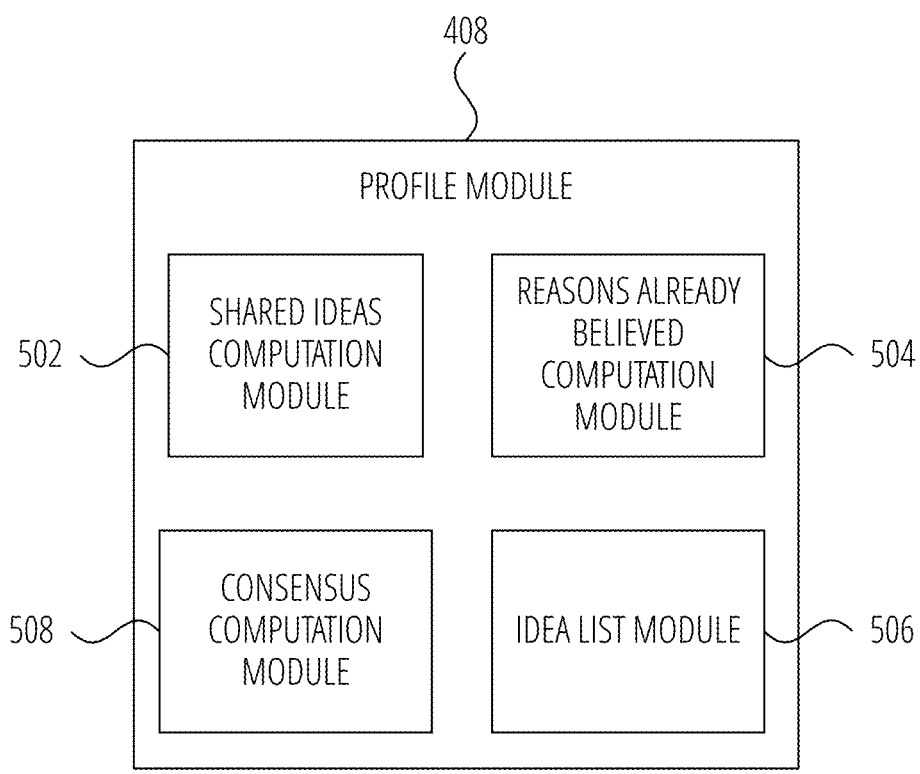
FIG. 5 illustrates a profile module in accordance with one example embodiment.

FIG. 5 illustrates a profile module 408 in accordance with one example embodiment. The profile module 408 comprises a shared ideas computation module 502, a reasons already believed computation module 504, an idea list module 506, and a consensus computation module 508.

Figure 10:
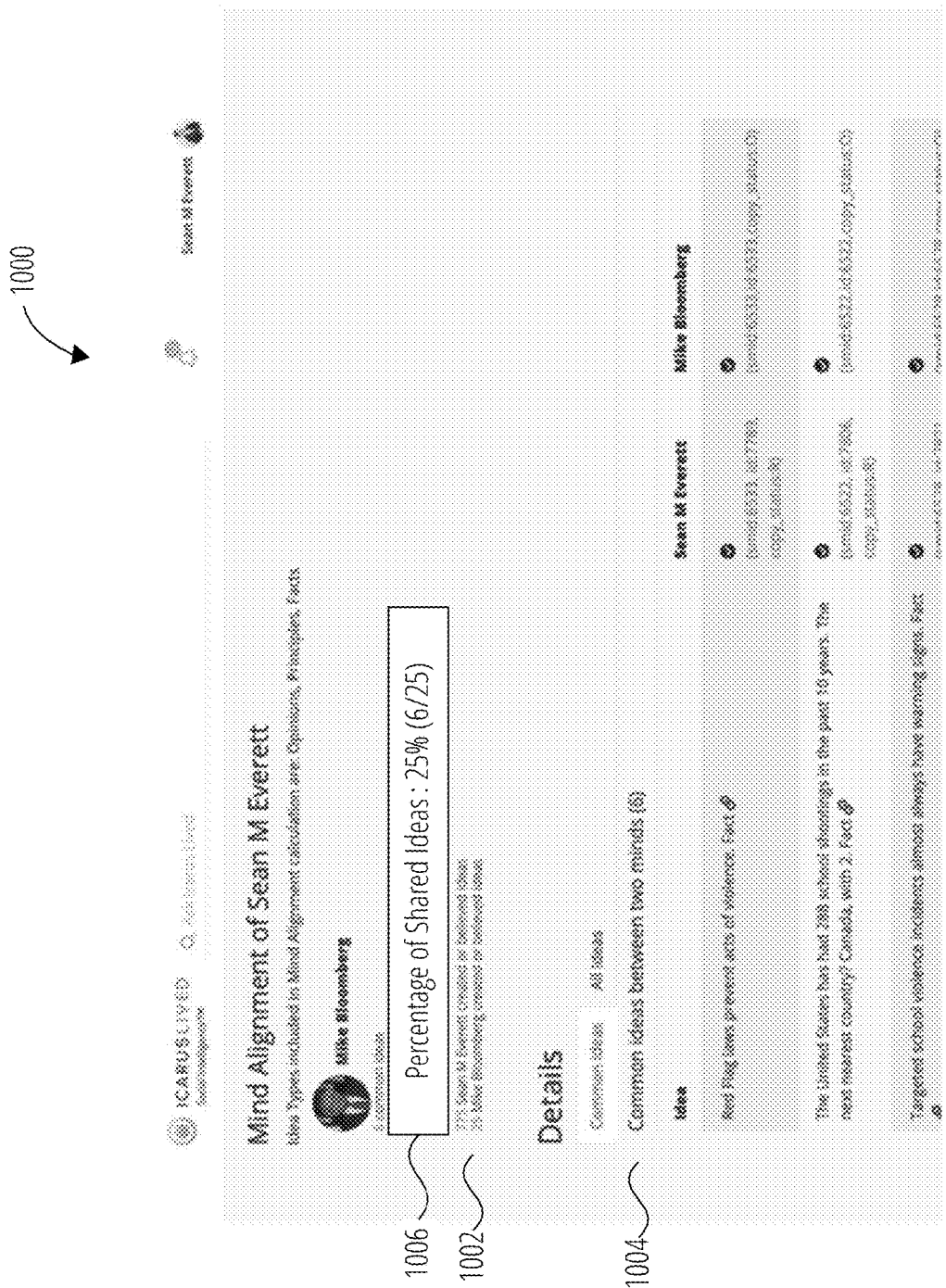
FIG. 10 illustrates a screenshot of a reader platform system in accordance with one example embodiment.

The shared ideas computation module 502 computes a first metric that measures a percentage of shared ideas (e.g., also referred to as mind alignment) between the reader and the author of the document. The calculation includes the following idea types: Opinions, Principles, Facts. The calculation does not include Values, Personal experience, Hypothetical Examples, or Meaning. The profile module 408 calculates the percentage of shared ideas as follows:

% of shared ideas=# of ideas that are believed or created by both users/# of ideas in the mind of the user with fewer thoughts As such, a user can look up at another user at a glance and understand how closely their thinking matches one another. FIG. 10 illustrates an example of percentage of shared ideas between two users. In FIG. 10, the shared ideas computation module 502 uses the above formula for percentage of shared ideas. In another example embodiment, the shared ideas computation module 502 uses the above formula for percentage of shared ideas when the sum of user1's total ideas believed or written and user2's total ideas believed or written is greater than a minimum total threshold (e.g., a minimum of 100 ideas).

The reasons already believed computation module 504 also computes a second metric that measures a percentage of reasons (e.g., supporting content) that the reader already believes. For example, the graphical user interface module 406 displays a reader's "% Believed" next to the Title of the Idea. The % believed represents how many of the Supporting Ideas (e.g., supporting content) the reader has already believed. As an example, Susan's % Believed=43% because she has already believed 3 out of 7 total supporting ideas within the document.

When a reader first reads a new document on the reader platform system 124, the "% Believed" is 0% because the reader has not yet believed any of the supporting ideas. If the author has leveraged a supporting idea that the reader has already believed, or the reader has otherwise believed any supporting ideas, the "% believed" would be higher (e.g., 10%, if the reader has believed 1 out of 10 total reasons).

The reasons already believed computation module 504 computes the % Believed of an idea based on the total number of Opinions, Principles, and Facts User1 Believes in an Article (excluding the Point) divided by the total number of Opinions, Principles, and Facts (excluding the Point) that exist within an Article.

The idea list module 506 enables the user to filter and search ideas that the user has believed (indicated as believed) on the reader platform system 124 and has authored on the authoring platform system 122.

Figure 11:
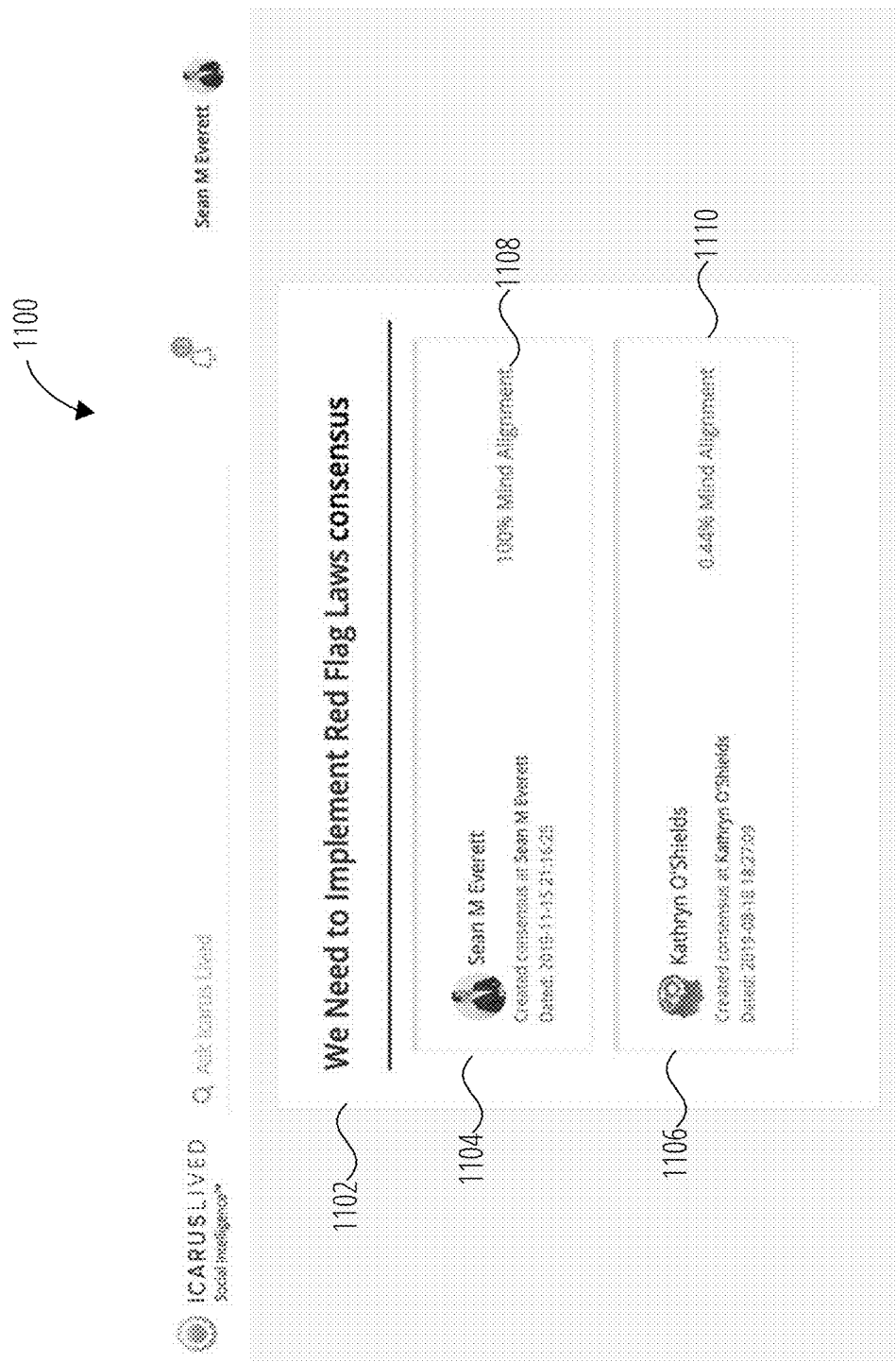
FIG. 11 illustrates a screenshot of a reader platform system in accordance with one example embodiment.

The consensus computation module 508 identifies a count of how many people (e.g., users of the reader platform system 124) believe an idea. In the screen shot of FIG. 11, both Sean and Kathryn clicked the believe button for the idea, "We Need to Implement Red Flag Laws." FIG. 11 shows the Featured Believer for that user first (e.g., Sean), followed by the other Believers (e.g., Kathryn) along with the date they believed it and each person's Mind Alignment.

Figure 6:
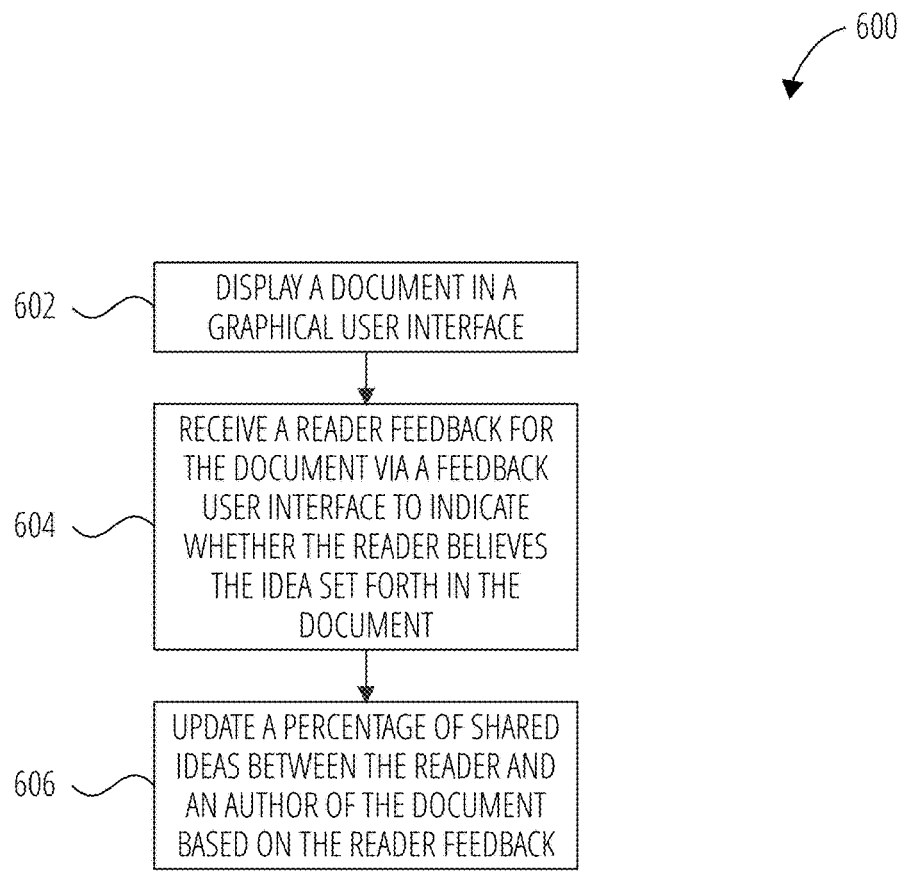
FIG. 6 illustrates a flow diagram of a method for displaying a document in accordance with one example embodiment.

FIG. 6 is a flow diagram illustrating a method 600 for receiving a reader feedback of a document based on a structured document template. The method 600 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

At block 602, the reader platform system 124 displays a document in a graphical user interface. In one example embodiment, the graphical user interface module 406 can be used to implement the operation of block 602.

At block 604, the reader platform system 124 receives a reader feedback for the document via a feedback user interface to indicate whether the reader believes the idea set forth in the document. In one example embodiment, the reader feedback module 404 can be used to implement the operation of block 604.

At block 606, the reader platform system 124 updates a percentage of shared ideas between the reader and an author of the document based on the reader feedback. In one example embodiment, the profile module 408 can be used to implement the operation of block 606.

Figure 7:
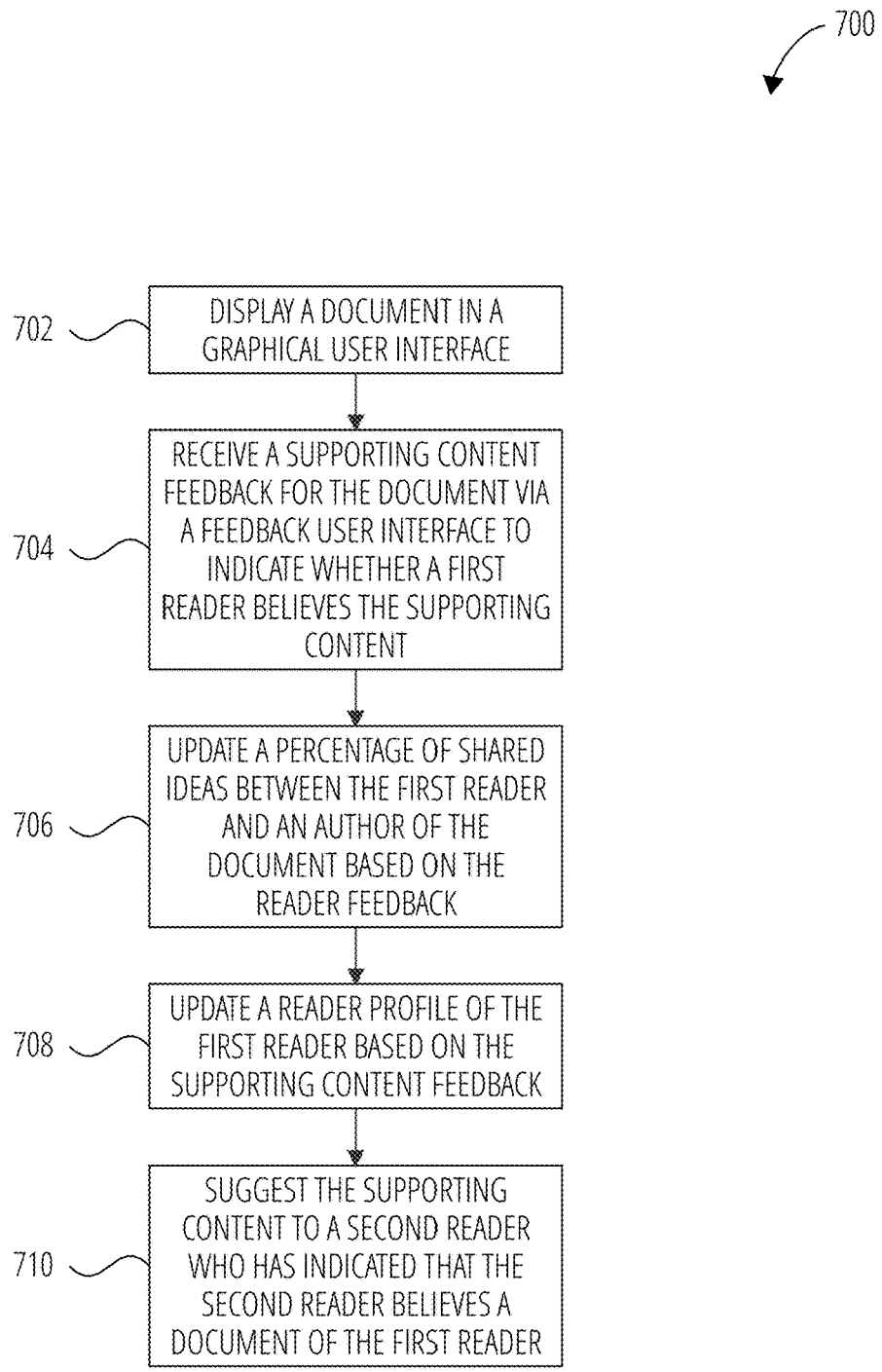
FIG. 7 illustrates a flow diagram of a method for displaying a document in accordance with another example embodiment.

FIG. 7 is a flow diagram illustrating a method 700 for updating a reader profile. The method 700 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

At block 702, the reader platform system 124 displays a document in a graphical user interface. In one example embodiment, the graphical user interface module 406 can be used to implement the operation of block 702.

At block 704, the reader platform system 124 receives a supporting content feedback for the document via a feedback user interface to indicate whether a first reader believes the supporting content. In one example embodiment, the reader feedback module 404 can be used to implement the operation of block 704.

At block 706, the reader platform system 124 updates a percentage of shared ideas between the first reader and an author of the document based on the reader feedback. In one example embodiment, the profile module 408 can be used to implement the operation of block 706.

At block 708, the reader platform system 124 updates a reader profile of the first reader based on the supporting content feedback. In one example embodiment, the profile module 408 can be used to implement the operation of block 708.

At block 710, the reader platform system 124 suggests the supporting content to a second reader who has indicated that the second reader believes a document of the first reader. In one example embodiment, the feed module 412 can be used to implement the operation of block 710.

Figure 8:
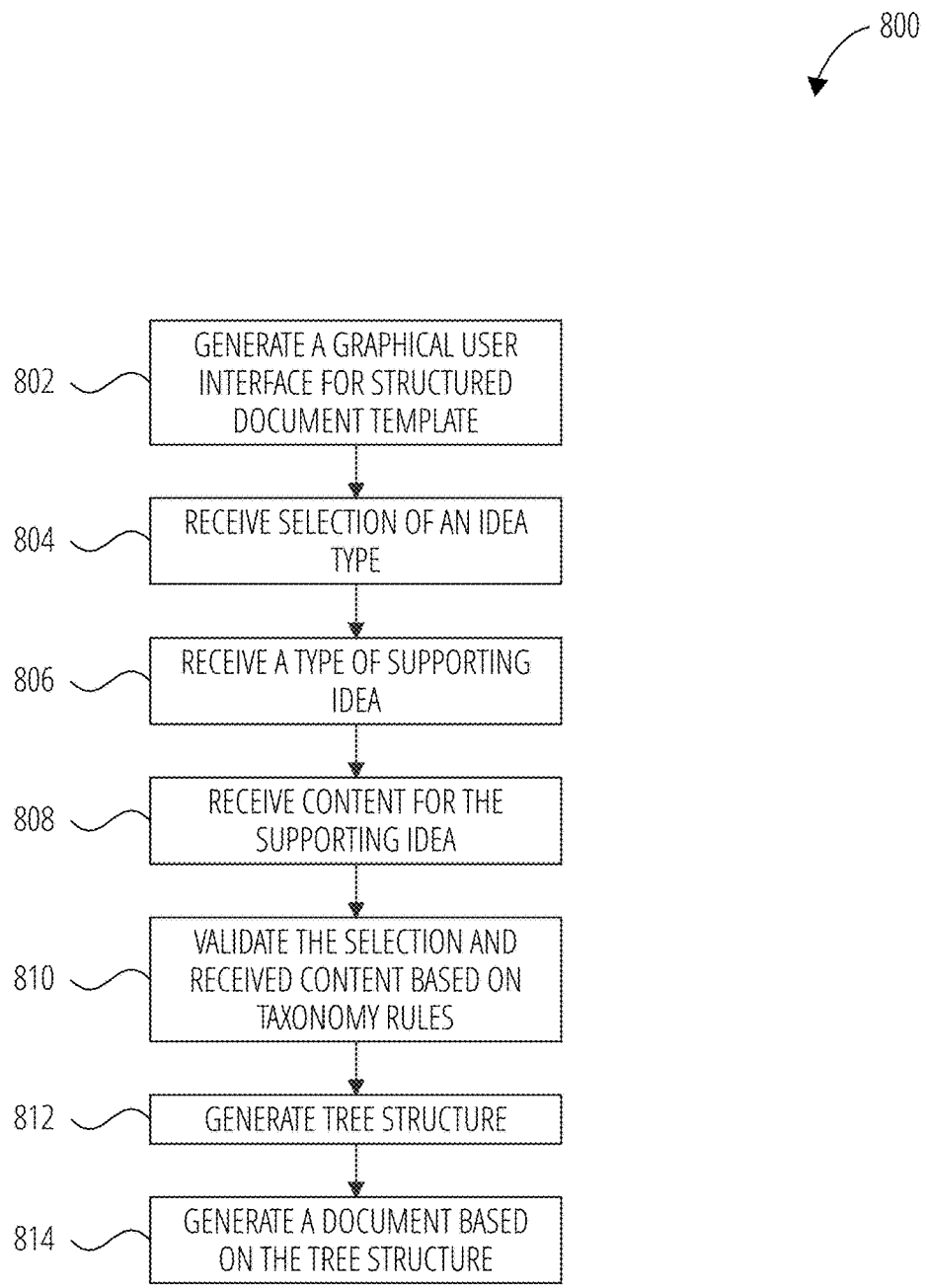
FIG. 8 illustrates a flow diagram of a method for generating a document in accordance with one example embodiment.

FIG. 8 is a flow diagram illustrating a method 800 for generating a document based on a structured document template. The method 800 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

At block 802, the authoring platform system 122 generates a graphical user interface for the structure document template. In one example embodiment, the graphical user interface module 210 can be used to implement the operation of block 802.

At block 804, the authoring platform system 122 receives a selection of an idea type. For example, the user 130 selects an "opinion" as an idea type. In one example embodiment, the document tree structure module 202 can be used to implement the operation of block 804.

At block 806, the authoring platform system 122 receives a type of supporting idea. In one example embodiment, the content support module 206 can be used to implement the operation of block 806.

At block 808, the authoring platform system 122 receives content for the supporting idea. In one example embodiment, the content support module 206 can be used to implement the operation of block 808.

At block 814, the authoring platform system 122 generates a document based on the received content. In one example embodiment, the document tree structure module 202 can be used to implement the operation of block 808.

Figure 9:
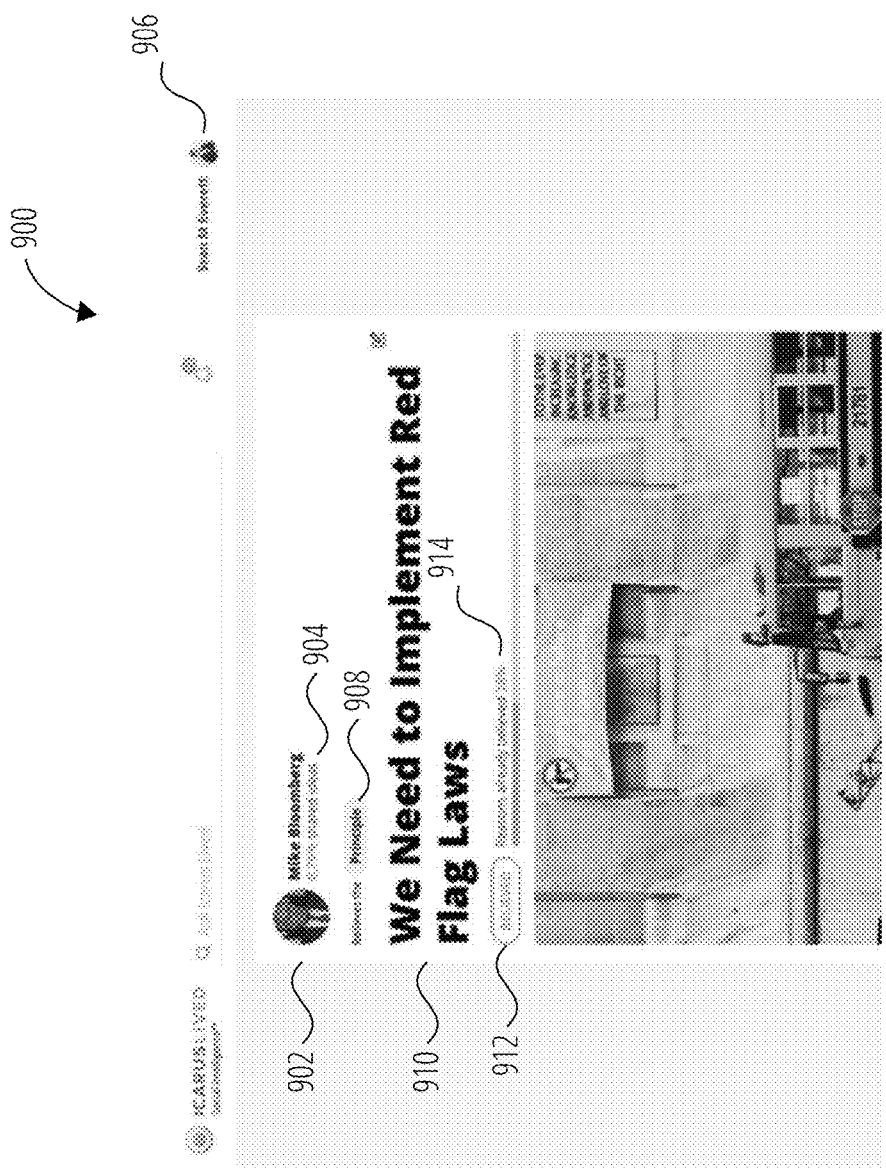
FIG. 9 illustrates a screenshot of a reader platform system in accordance with one example embodiment.

FIG. 9 illustrates a screenshot 900 of the reader platform system 124 in accordance with one example embodiment. The screenshot 900 illustrates an author identifier 902 (e.g., author's name), a shared ideas indicator 904, a reader identifier 906 (e.g., reader's name), an idea type 908, an idea title 910, a user feedback indicator 912, and a reasons already believed indicator 914. The shared ideas indicator 904 indicates the percentage of shared ideas between the author identifier 902 and the reader identifier 906 of the article. An example of calculating the percentage of shared ideas is previously above with respect to the shared ideas computation module 502 at FIG. 5. The idea type 908 identifies the types of the idea set forth in the article written by the author. For example, FIG. 9 illustrates that the author believes a "principle" set forth in the article viewed by the reader. The user feedback indicator 912 displays an indicator that indicates whether the reader believes the article. For example, the user feedback indicator 912 includes a clickable user interface element that toggles between different states (e.g., believed, not-believed, believe). The reasons already believed indicator 914 indicates the percentage of reasons (from the article) that the reader already believes. An example of calculating the percentage of reasons already believed is previously above with respect to the reasons already believed computation module 504 at FIG. 5.

FIG. 10 illustrates a screenshot 1000 of the reader platform system 124 in accordance with one example embodiment. The screenshot 1000 illustrates a shared ideas indicator 1006, an idea statistics 1002, and a list of common ideas 1004. The shared ideas indicator 1006 indicates the number of common ideas (e.g., 6) between the reader and the author of the article, the number of ideas from the user with fewer thoughts/ideas (e.g., Sean has 775 ideas and Mike has 25 ideas; in this case Mike has fewer thoughts than Sean), and the percentage of shared ideas (e.g., 25%). The idea statistics 1002 indicates the number of ideas that the reader has authored or believed and the number of ideas that the author of the article has authored or believed. The list of common ideas 1004 indicates the common ideas between the reader and the author. For example, the list of common ideas 1004 specifies each common idea.

FIG. 11 illustrates a screenshot 1100 of the reader platform system 124 in accordance with one example embodiment. The screenshot 1100 illustrates an idea consensus 1102, a reader profile 1104, a reader profile 1106, an idea alignment indicator 1108, and an idea alignment indicator 1110. The idea consensus 1102 describes a consensus of people who believe the shown idea (i.e., "We Need to Implement Red Flag Laws"). The screenshot 1100 displays two readers with the corresponding profiles (e.g., reader profile 1104, reader profile 1106). The idea alignment indicator 1108 shows that Sean (reader profile 1104) has a 100% mind alignment with himself (reader profile 1104). The idea alignment indicator 1110 shows that Kathryn (reader profile 11066) has a 0.44% mind alignment with Sean (reader profile 1104).

Figure 12:
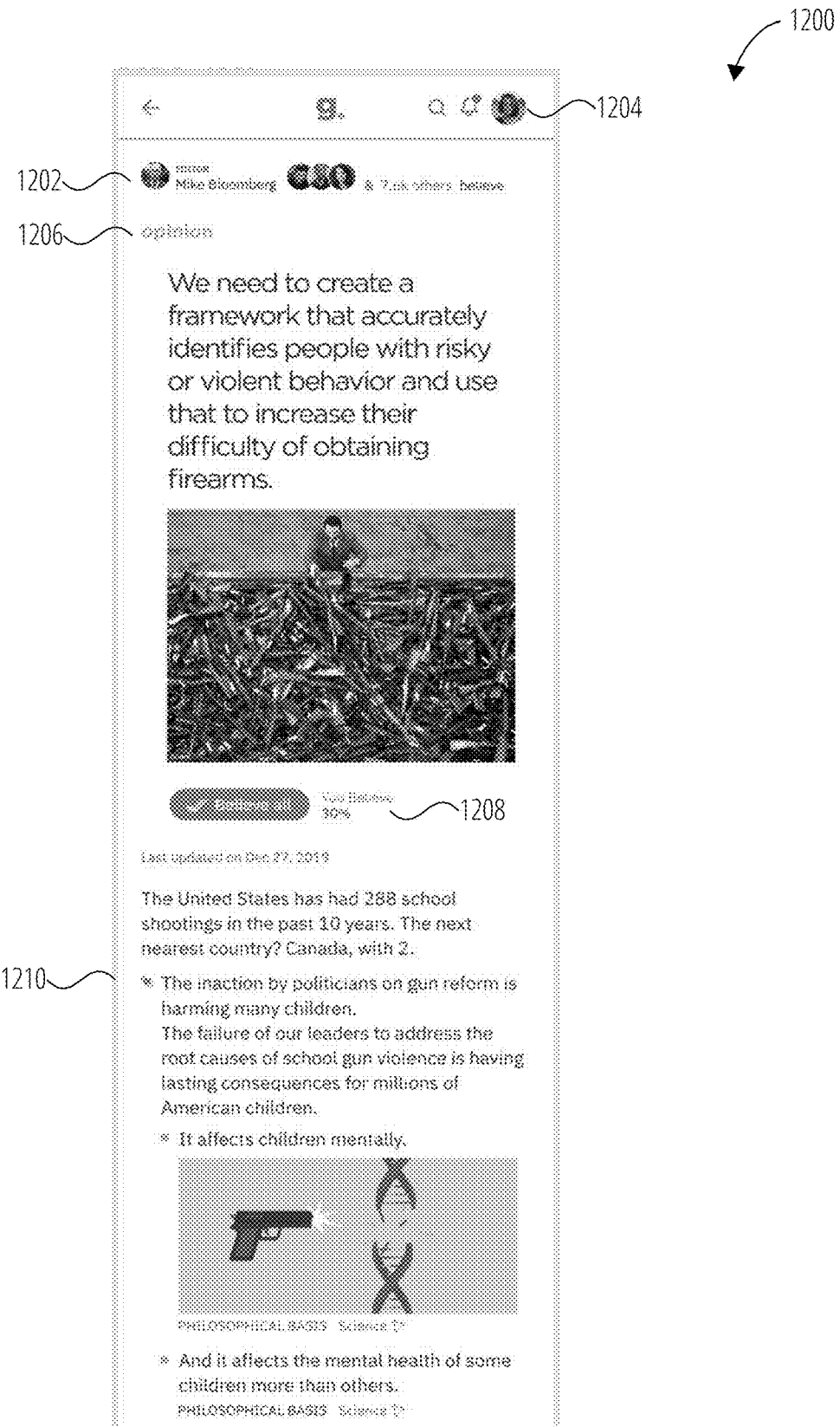
FIG. 12 illustrates a screenshot of a reader platform system in accordance with one example embodiment.

FIG. 12 illustrates a screenshot 1200 of the reader platform system 124 in accordance with one example embodiment. The screenshot 1200 illustrates an article written by an author as shown by an author identifier 1202, a reader identifier 1204, and an idea type 1206 (e.g., opinion). The screenshot 1200 also includes supporting content 1210 (e.g., bullet list of supporting content that supports the opinion based on the taxonomy rules previously described above).

Figure 13:
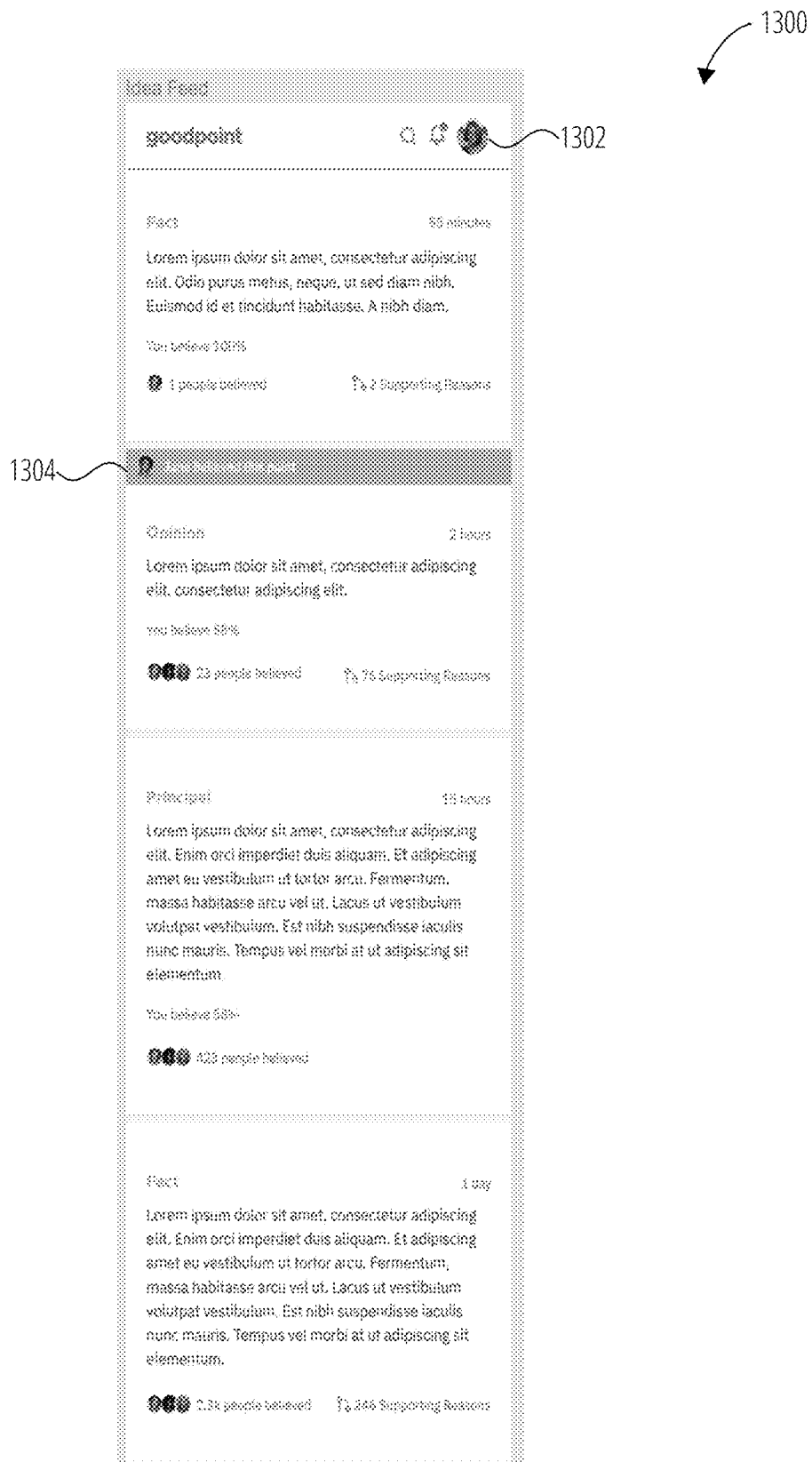
FIG. 13 illustrates a screenshot of a reader platform system in accordance with one example embodiment.

FIG. 13 illustrates a screenshot 1300 of the reader platform system 124 in accordance with one example embodiment. The screenshot 1300 illustrates a feed for a reader as identified by a reader identifier 1302. The screenshot 1300 also indicates whether an article is believed/validated/approved by another reader (that is connected to the current reader associated with the reader identifier 1302). The connection may be based on a social network. The user shared idea indicator 1304 represents a Featured Believer that the Reader is likely to be influenced by.

FIG. 14 illustrates a screenshot 1400 of the reader platform system 124 in accordance with one example embodiment. The screenshot 1400 enables the user/reader to search using a point search term 1402 (e.g., "health care") or a people search term 1404 (e.g., "chervin"). In the points search results 1406 are displayed in response to the point search term 1402. The people search results 1408 are displayed in response to the people search term 1404.

Figure 15:
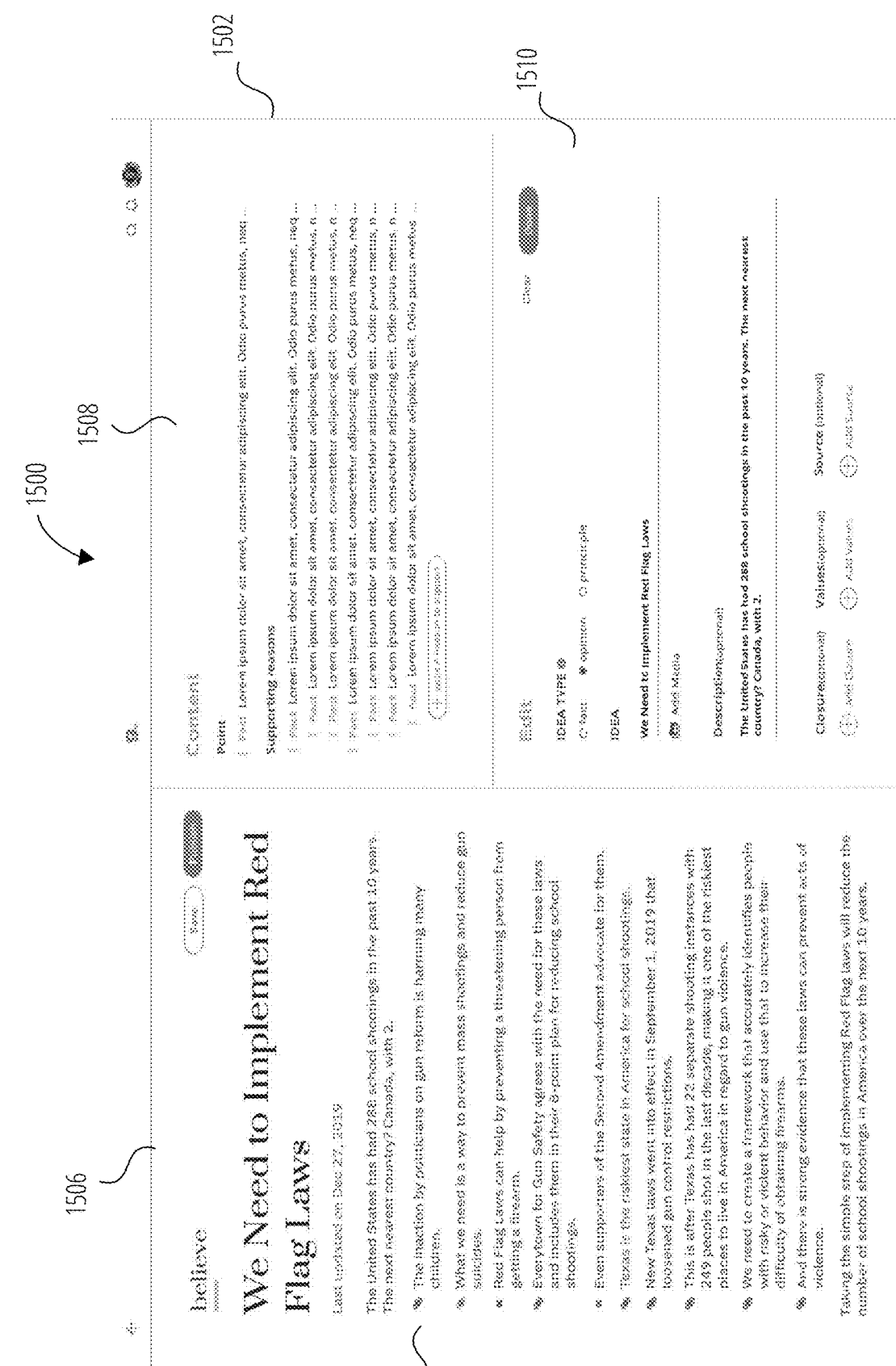
FIG. 15 illustrates a screenshot of a reader platform system in accordance with one example embodiment.

FIG. 15 illustrates a screenshot 1500 of the reader platform system 124 in accordance with one example embodiment. In another example, FIG. 15 a screenshot 1500 of the authoring platform system 122. The screenshot 1500 illustrates a graphical user interface 1502 that has three sections: section 1506, section 1508, section 1510. Section 1506 allows the user 130 to edit content in a form that resembles its appearance when the article is published in section 1506. The section 1506 displays support content 1504 that represent branches of the tree structure. Each support content 1504 can be further broken down into smaller fundamental components (e.g., fact, source). Section 1508 illustrates the tree structure in a bullet point format. The section 1510 enables the user 130 to edit metadata of the article.

Figure 16:
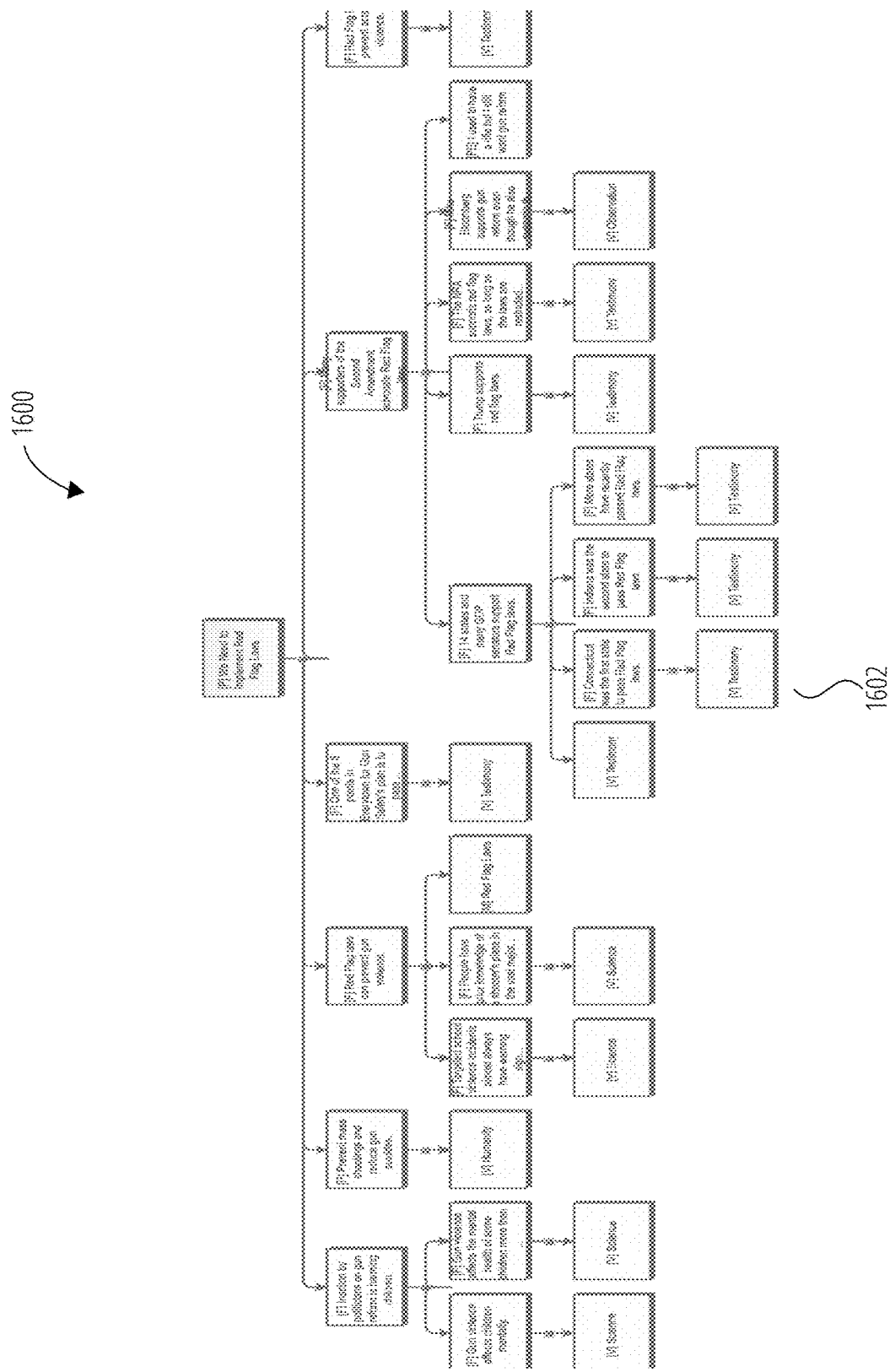
FIG. 16 illustrates a screenshot of a tree structure in accordance with one example embodiment.

FIG. 16 illustrates a screenshot 1600 of the reader platform system 124 in accordance with one example embodiment. The screenshot 1600 illustrates an example of a tree structure 1602.

Figure 17:
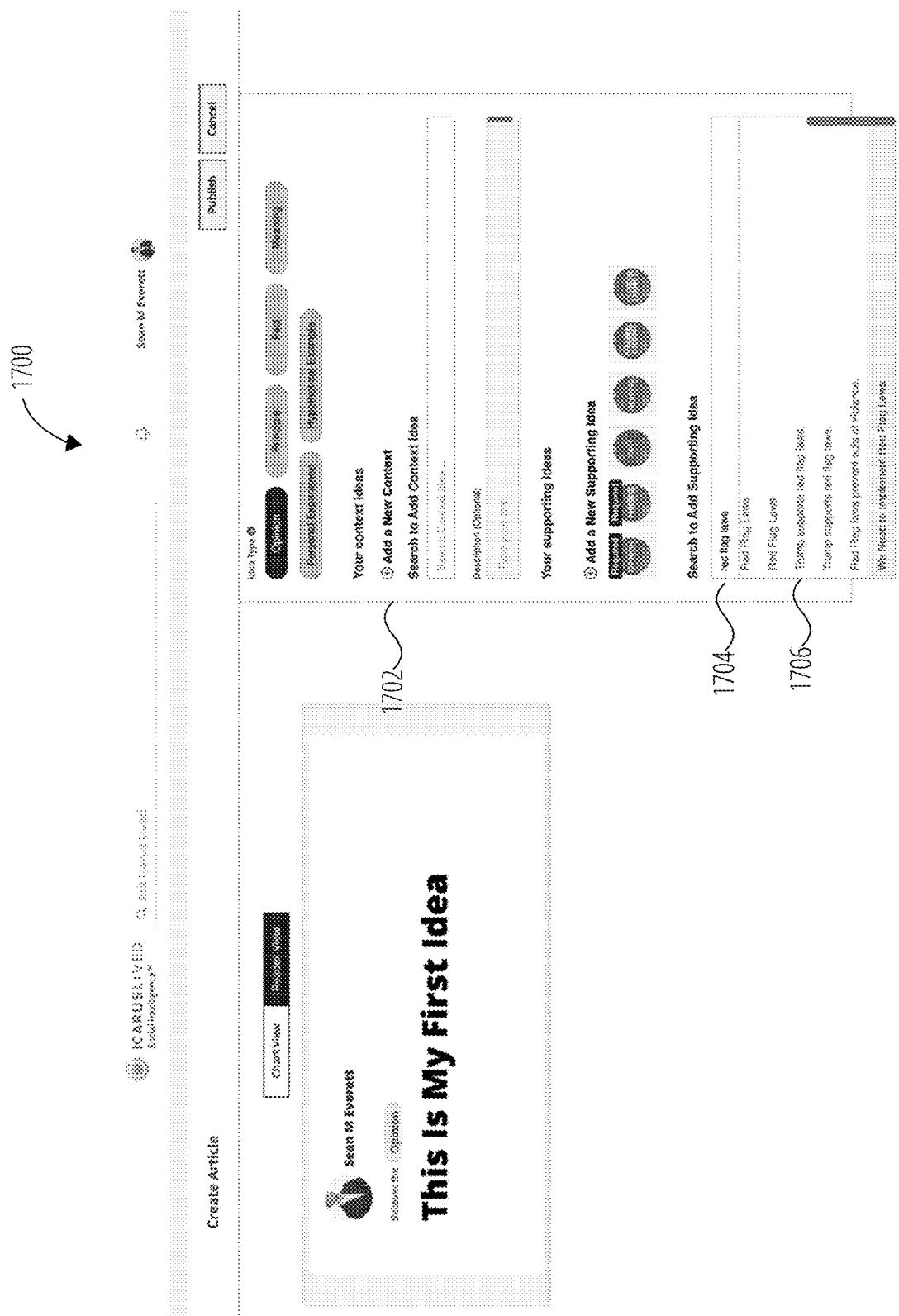
FIG. 17 illustrates a screenshot of a document being edited in accordance with one example embodiment.

FIG. 17 illustrates a screenshot 1700 of the authoring platform system 122 in accordance with one example embodiment. The screenshot 1700 illustrates a structured document template 1702. The structured document template 1702 enables the user 130 to input a search term in the search query 1704. The user 130 can then select one of the results from the search results 1706. The selected results will be leveraged and incorporated in a document presently edited by the user 130.

Figure 18:
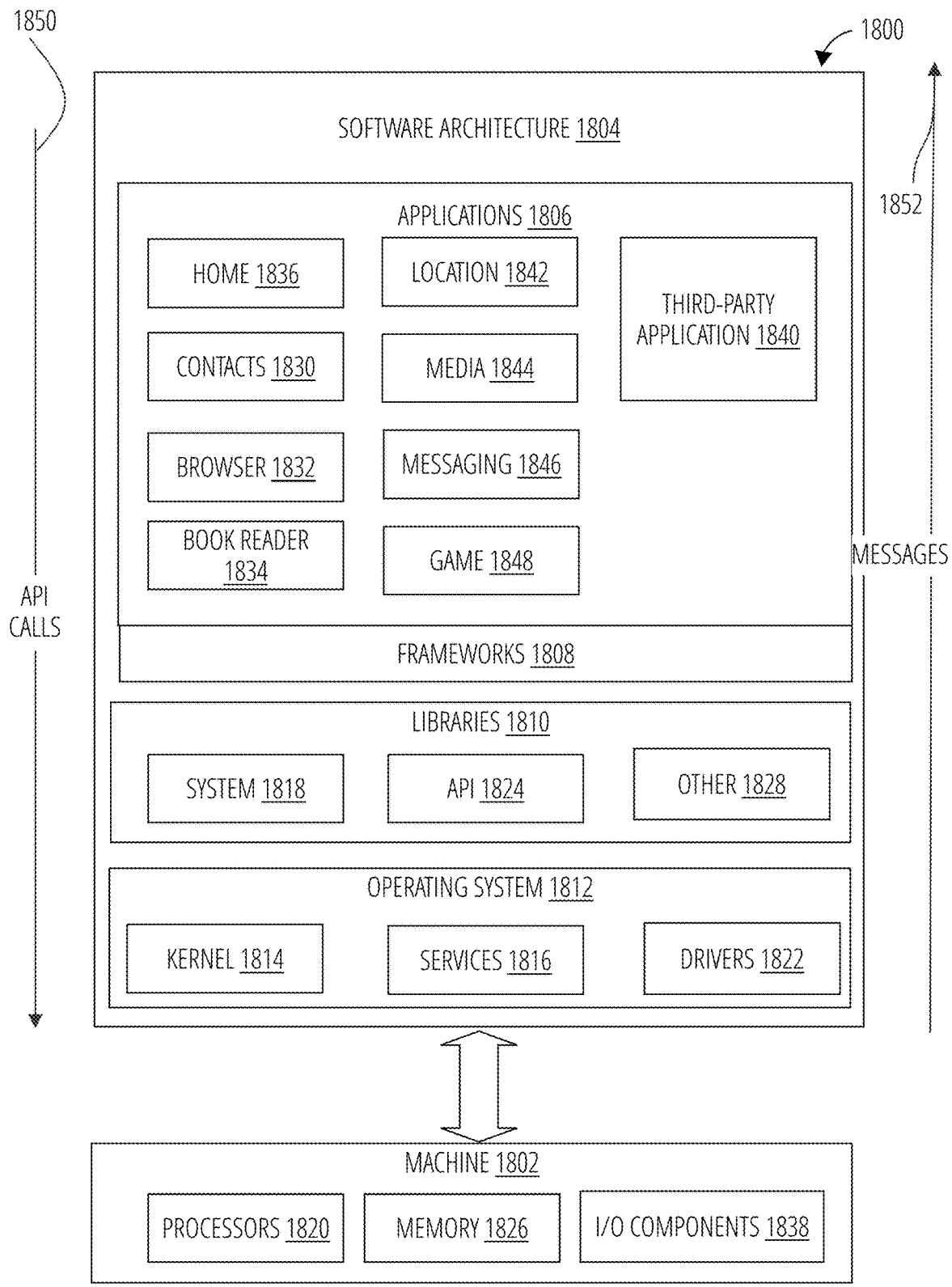
FIG. 18 is block diagram showing a software architecture within which the present disclosure may be implemented, according to an example embodiment.

FIG. 18 is a block diagram 1800 illustrating a software architecture 1804, which can be installed on any one or more of the devices described herein. The software architecture 1804 is supported by hardware such as a machine 1802 that includes processors 1820, memory 1826, and I/O components 1838. In this example, the software architecture 1804 can be conceptualized as a stack of layers, where each layer provides a particular functionality. The software architecture 1804 includes layers such as an operating system 1812, libraries 1810, frameworks 1808, and applications 1806. Operationally, the applications 1806 invoke API calls 1850 through the software stack and receive messages 1852 in response to the API calls 1850.

The operating system 1812 manages hardware resources and provides common services. The operating system 1812 includes, for example, a kernel 1814, services 1816, and drivers 1822. The kernel 1814 acts as an abstraction layer between the hardware and the other software layers. For example, the kernel 1814 provides memory management, processor management (e.g., scheduling), component management, networking, and security settings, among other functionality. The services 1816 can provide other common services for the other software layers. The drivers 1822 are responsible for controlling or interfacing with the underlying hardware. For instance, the drivers 1822 can include display drivers, camera drivers, BLUETOOTH® or BLUETOOTH® Low Energy drivers, flash memory drivers, serial communication drivers (e.g., Universal Serial Bus (USB) drivers), WI-FED drivers, audio drivers, power management drivers, and so forth.

The libraries 1810 provide a low-level common infrastructure used by the applications 1806. The libraries 1810 can include system libraries 1818 (e.g., C standard library) that provide functions such as memory allocation functions, string manipulation functions, mathematic functions, and the like. In addition, the libraries 1810 can include API libraries 1824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1810 can also include a wide variety of other libraries 1828 to provide many other APIs to the applications 1806.

The frameworks 1808 provide a high-level common infrastructure that is used by the applications 1806. For example, the frameworks 1808 provide various graphical user interface (GUI) functions, high-level resource management, and high-level location services. The frameworks 1808 can provide a broad spectrum of other APIs that can be used by the applications 1806, some of which may be specific to a particular operating system or platform.

In an example embodiment, the applications 1806 may include a home application 1836, a contacts application 1830, a browser application 1832, a book reader application 1834, a location application 1842, a media application 1844, a messaging application 1846, a game application 1848, and a broad assortment of other applications such as a third-party application 1840. The applications 1806 are programs that execute functions defined in the programs. Various programming languages can be employed to create one or more of the applications 1806, structured in a variety of manners, such as object-oriented programming languages (e.g., JavaScript, Python, Objective-C, Java, or C++) or procedural programming languages (e.g., C or assembly language). In a specific example, the third-party application 1840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1840 can invoke the API calls 1850 provided by the operating system 1812 to facilitate functionality described herein.

Figure 19:
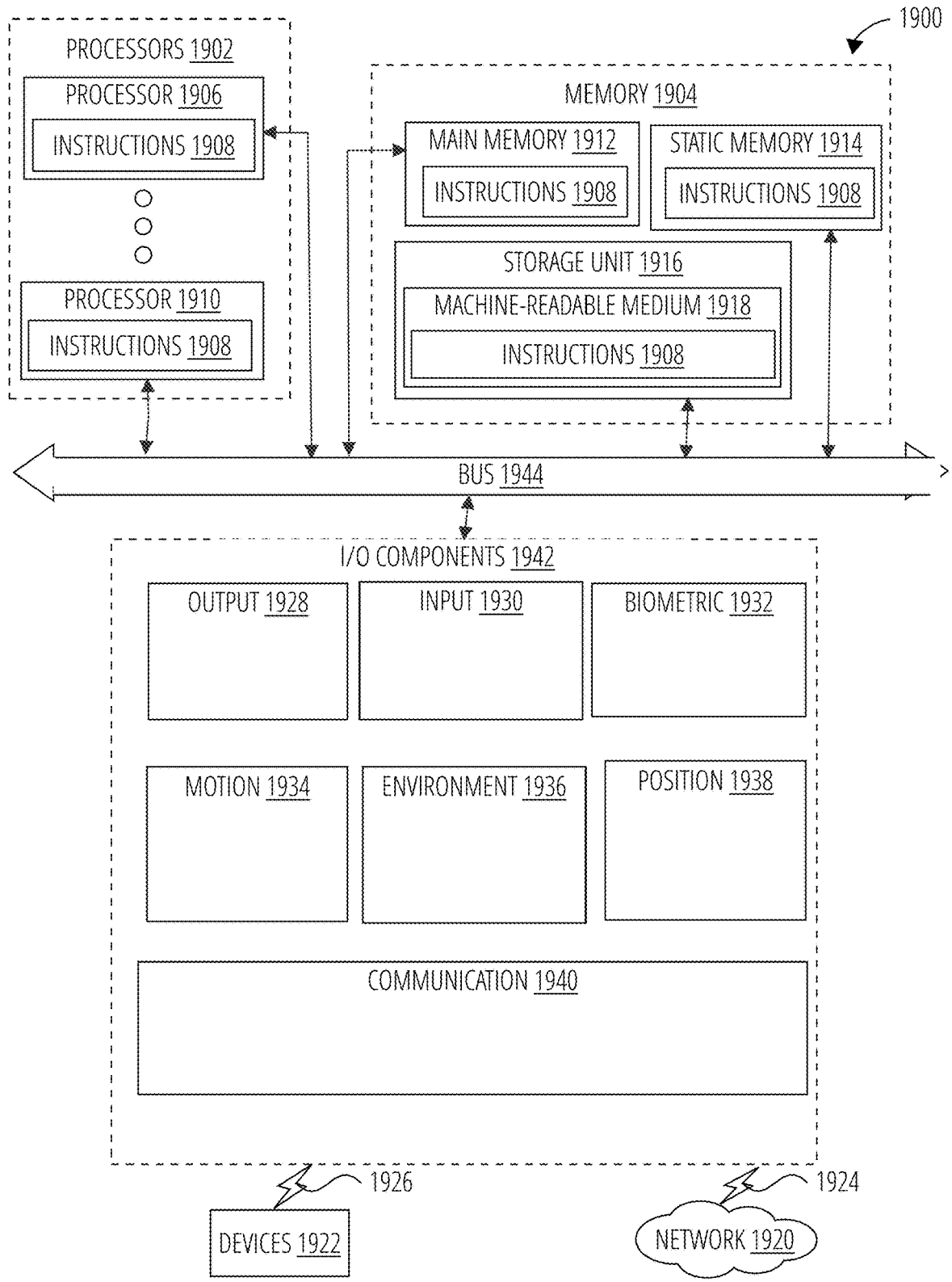
FIG. 19 is a diagrammatic representation of a machine in the form of a computer system within which a set of instructions may be executed for causing the machine to perform any one or more of the methodologies discussed herein, according to an example embodiment.

FIG. 19 is a diagrammatic representation of the machine 1900 within which instructions 1908 (e.g., software, a program, an application, an applet, an app, or other executable code) for causing the machine 1900 to perform any one or more of the methodologies discussed herein may be executed. For example, the instructions 1908 may cause the machine 1900 to execute any one or more of the methods described herein. The instructions 1908 transform the general, non-programmed machine 1900 into a particular machine 1900 programmed to carry out the described and illustrated functions in the manner described. The machine 1900 may operate as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1908, sequentially or otherwise, that specify actions to be taken by the machine 1900. Further, while only a single machine 1900 is illustrated, the term "machine" shall also be taken to include a collection of machines that individually or jointly execute the instructions 1908 to perform any one or more of the methodologies discussed herein.

The machine 1900 may include processors 1902, memory 1904, and I/O components 1942, which may be configured to communicate with each other via a bus 1944. In an example embodiment, the processors 1902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1906 and a processor 1910 that execute the instructions 1908. The term "processor" is intended to include multi-core processors that may comprise two or more independent processors (sometimes referred to as "cores") that may execute instructions contemporaneously. Although FIG. 19 shows multiple processors 1902, the machine 1900 may include a single processor with a single core, a single processor with multiple cores (e.g., a multi-core processor), multiple processors with a single core, multiple processors with multiples cores, or any combination thereof.

The memory 1904 includes a main memory 1912, a static memory 1914, and a storage unit 1916, both accessible to the processors 1902 via the bus 1944. The main memory 1904, the static memory 1914, and storage unit 1916 store the instructions 1908 embodying any one or more of the methodologies or functions described herein. The instructions 1908 may also reside, completely or partially, within the main memory 1912, within the static memory 1914, within machine-readable medium 1918 within the storage unit 1916, within at least one of the processors 1902 (e.g., within the processor's cache memory), or any suitable combination thereof, during execution thereof by the machine 1900.

The I/O components 1942 may include a wide variety of components to receive input, provide output, produce output, transmit information, exchange information, capture measurements, and so on. The specific I/O components 1942 that are included in a particular machine will depend on the type of machine. For example, portable machines such as mobile phones may include a touch input device or other such input mechanisms, while a headless server machine will likely not include such a touch input device. It will be appreciated that the I/O components 1942 may include many other components that are not shown in FIG. 19. In various example embodiments, the I/O components 1942 may include output components 1928 and input components 1930. The output components 1928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1942 may include biometric components 1932, motion components 1934, environmental components 1936, or position components 1938, among a wide array of other components. For example, the biometric components 1932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1934 include acceleration sensor components (e.g., accelerometer), gravitation sensor components, rotation sensor components (e.g., gyroscope), and so forth. The environmental components 1936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1942 further include communication components 1940 operable to couple the machine 1900 to a network 1920 or devices 1922 via a coupling 1924 and a coupling 1926, respectively. For example, the communication components 1940 may include a network interface component or another suitable device to interface with the network 1920. In further examples, the communication components 1940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1922 may be another machine or any of a wide variety of peripheral devices (e.g., a peripheral device coupled via a USB).

Moreover, the communication components 1940 may detect identifiers or include components operable to detect identifiers. For example, the communication components 1940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1940, such as location via Internet Protocol (IP) geolocation, location via Wi-Fi® signal triangulation, location via detecting an NFC beacon signal that may indicate a particular location, and so forth.

The various memories (e.g., memory 1904, main memory 1912, static memory 1914, and/or memory of the processors 1902) and/or storage unit 1916 may store one or more sets of instructions and data structures (e.g., software) embodying or used by any one or more of the methodologies or functions described herein. These instructions (e.g., the instructions 1908), when executed by processors 1902, cause various operations to implement the disclosed embodiments.

The instructions 1908 may be transmitted or received over the network 1920, using a transmission medium, via a network interface device (e.g., a network interface component included in the communication components 1940) and using any one of a number of well-known transfer protocols (e.g., hypertext transfer protocol (HTTP)). Similarly, the instructions 1908 may be transmitted or received using a transmission medium via the coupling 1926 (e.g., a peer-to-peer coupling) to the devices 1922.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a computer-implemented method comprising: causing a display of a document that is formed based on a tree structure from a structured document template with an idea type attribute and content of a supporting idea type attribute that is based on the idea type attribute, the idea type attribute and the content of the supporting idea type attribute validated based on taxonomy rules for the structured document template; receiving a reader feedback of the document via a feedback user interface of the display; and updating a profile of a reader of the document and a profile of an author of the document based on the reader feedback.

Example 2 includes example 1, wherein the display of the document further comprises: an identification of the author of the document; an identification of the idea type attribute of the document; a first metric indicating a percentage of shared ideas between the author and the reader; a second metric indicating a percentage of reasons already believed by the reader.

Example 3 includes any of the above examples, wherein the reader feedback comprises a first state or a second state, the first state indicating that the reader believes the content of the supporting idea type attribute in the document, the second state indicating that the reader does not believe the content of the supporting idea type attribute in the document, wherein the method further comprises: updating the first or second metric based on the first or second state of the reader feedback from the reader of the document.

Example 4 includes any of the above examples, further comprising: updating the first metric or the second metric in response to receiving the reader feedback from the reader of the document, wherein the updated profile of the reader indicates that the reader validates an idea set forth in the document, and generating a suggestion of the document in a feed of another reader related to the reader in response to the reader validating the idea set forth in the document.

Example 5 includes any of the above examples, further comprising: determining a number of common documents indicated as believed by both the reader and the author; determining a total number of documents indicated as believed by both the reader and the author; and computing the first metric based on a ratio of the number of common documents by the total number of documents.

Example 6 includes any of the above examples, further comprising: identifying the common documents; and presenting a list of the common documents in the display.

Example 7 includes any of the above examples, further comprising: determining a number of believed content of the supporting idea type attribute by the reader; determining a number of content of the supporting idea type attribute in the document; and computing the second metric based on a ratio of the number of believed content of the supporting idea type attribute by the reader by the number of content of the supporting idea type attribute in the document.

Example 8 includes any of the above examples, wherein receiving the reader feedback of the document further comprises: receiving a supporting content feedback associated with content of the supporting idea type attribute in the document; and updating the second metric in response to receiving a supporting content feedback associated with content of the supporting idea type attribute in the document.

Example 9 includes any of the above examples, further comprising: identifying other documents based on the first and second metric; and presenting a suggestion of one or more of the other documents in the display.

Example 10 includes any of the above examples, wherein the taxonomy rules comprise content rules that map the supporting idea type attribute to the idea type attribute, wherein the value of the idea type attribute comprises one of a content, a belief system, an opinion, a principle, a fact, a meaning, a personal experience, or a hypothetical example, and wherein the value of the supporting idea type attribute comprises one of an opinion, a principle, a fact, a meaning, a personal experience, a hypothetical example, or a fundamental belief.

Example 11 is a computing apparatus comprising: a Processor; and a memory storing instructions that, when executed by the Processor, configure the apparatus to perform operations comprising: cause a display of a document that is formed based on a tree structure from a structured document template with an idea type attribute and content of a supporting idea type attribute that is based on the idea type attribute, the idea type attribute and the content of the supporting idea type attribute validated based on taxonomy rules for the structured document template; receive a reader feedback of the document via a feedback user interface of the display; and update a profile of a reader of the document and a profile of an author of the document based on the reader feedback.

Example 12 includes example 11, wherein the display of the document further comprises: an identification of the author of the document; an identification of the idea type attribute of the document; a first metric indicate a percentage of shared ideas between the author and the reader; a second metric indicate a percentage of reasons already believed by the reader.

Example 13 includes any of the above examples, wherein the reader feedback comprises a first state or a second state, the first state indicate that the reader believes the content of the supporting idea type attribute in the document, the second state indicating that the reader does not believe the content of the supporting idea type attribute in the document, wherein the method further comprises: update the first or second metric based on the first or second state of the reader feedback from the reader of the document.

Example 14 includes any of the above examples, wherein the instructions further configure the apparatus to: update the first metric or the second metric in response to receiving the reader feedback from the reader of the document, wherein the updated profile of the reader indicates that the reader validates an idea set forth in the document, and generate a suggestion of the document in a feed of another reader related to the reader in response to the reader validating the idea set forth in the document.

Example 15 includes any of the above examples, wherein the instructions further configure the apparatus to: determine a number of common documents indicated as believed by both the reader and the author; determine a total number of documents indicated as believed by both the reader and the author; and compute the first metric based on a ratio of the number of common documents by the total number of documents.

Example 16 includes any of the above examples, wherein the instructions further configure the apparatus to: identify the common documents; and present a list of the common documents in the display.

Example 17 includes any of the above examples, wherein the instructions further configure the apparatus to: determine a number of believed content of the supporting idea type attribute by the reader; determine a number of content of the supporting idea type attribute in the document; and compute the second metric based on a ratio of the number of believed content of the supporting idea type attribute by the reader by the number of content of the supporting idea type attribute in the document.

Example 18 includes any of the above examples, wherein receiving the reader feedback of the document further comprises: receive a supporting content feedback associated with content of the supporting idea type attribute in the document; and update the second metric in response to receiving a supporting content feedback associated with content of the supporting idea type attribute in the document.

Example 19 includes any of the above examples, wherein the instructions further configure the apparatus to: identify other documents based on the first and second metric; and present a suggestion of one or more of the other documents in the display, wherein the taxonomy rules comprise content rules that map the supporting idea type attribute to the idea type attribute, wherein the value of the idea type attribute comprises one of a content, a belief system, an opinion, a principle, a fact, a meaning, a personal experience, or a hypothetical example, and wherein the value of the supporting idea type attribute comprises one of an opinion, a principle, a fact, a meaning, a personal experience, a hypothetical example, or a fundamental belief.

Example 20 is a non-transitory computer-readable storage medium, the computer-readable storage medium including instructions that when executed by a computer, cause the computer to perform operations comprising: cause a display of a document that is formed based on a tree structure from a structured document template with an idea type attribute and content of a supporting idea type attribute that is based on the idea type attribute, the idea type attribute and the content of the supporting idea type attribute validated based on taxonomy rules for the structured document template; receive a reader feedback of the document via a feedback user interface of the display; and update a profile of a reader of the document and a profile of an author of the document based on the reader feedback.

What is claimed is:

1. A computer-implemented method comprising:
   causing a display of a document that is formed based on a tree structure from a structured document template with an idea type attribute and content of a supporting idea type attribute that is based on the idea type attribute, the idea type attribute and the content of the supporting idea type attribute validated based on taxonomy rules for the structured document template;
   receiving a reader feedback of the document via a feedback user interface of the display; and
   updating a profile of a reader of the document and a profile of an author of the document based on the reader feedback;
   wherein the display of the document further comprises: an identification of the author of the document; an identification of the idea type attribute of the document; a first metric indicating a percentage of shared ideas between the author and the reader; a second metric indicating a percentage of reasons already believed by the reader,
   wherein the reader feedback comprises a first state or a second state, the first state indicating that the reader believes the content of the supporting idea type attribute in the document, the second state indicating that the reader does not believe the content of the supporting idea type attribute in the document, and wherein the method further comprises:

updating the first or second metric based on the first or second state of the reader feedback from the reader of the document.

2. The computer-implemented method of claim 1, further comprising: updating the first metric or the second metric in response to receiving the reader feedback from the reader of the document, wherein the updated profile of the reader indicates that the reader validates an idea set forth in the document, and generating a suggestion of the document in a feed of another reader related to the reader in response to the reader validating the idea set forth in the document.

3. The computer-implemented method of claim 1, further comprising: determining a number of common documents indicated as believed by both the reader and the author; determining a total number of documents indicated as believed by both the reader and the author; and computing the first metric based on a ratio of the number of common documents by the total number of documents.

4. The computer-implemented method of claim 3, further comprising:

identifying the common documents; and presenting a list of the common documents in the display.

5. The computer-implemented method of claim 1, further comprising:

determining a number of believed content of the supporting idea type attribute by the reader;

determining a number of content of the supporting idea type attribute in the document; and computing the second metric based on a ratio of the number of believed content of the supporting idea type attribute by the reader by the number of content of the supporting idea type attribute in the document.

6. The computer-implemented method of claim 1, wherein receiving the reader feedback of the document further comprises:

receiving a supporting content feedback associated with content of the supporting idea type attribute in the document; and updating the second metric in response to receiving a supporting content feedback associated with content of the supporting idea type attribute in the document.

7. The computer-implemented method of claim 1, further comprising:

identifying other documents based on the first and second metric; and presenting a suggestion of one or more of the other documents in the display.

8. The computer-implemented method of claim 1, wherein the taxonomy rules comprise content rules that map the supporting idea type attribute to the idea type attribute, wherein the value of the idea type attribute comprises one of a content, a belief system, an opinion, a principle, a fact, a meaning, a personal experience, or a hypothetical example, and wherein the value of the supporting idea type attribute comprises one of an opinion, a principle, a fact, a meaning, a personal experience, a hypothetical example, or a fundamental belief.

9. A computing apparatus, the computing apparatus comprising:

a processor; and a memory storing instructions that, when executed by the processor, configure the apparatus to perform operations comprising:

cause a display of a document that is formed based on a tree structure from a structured document template with an idea type attribute and content of a supporting idea type attribute that is based on the idea type attribute, the idea type attribute and the content of the supporting idea type attribute validated based on taxonomy rules for the structured document template;

receive a reader feedback of the document via a feedback user interface of the display; and update a profile of a reader of the document and a profile of an author of the document based on the reader feedback;

wherein the display of the document further comprises:

an identification of the author of the document;

an identification of the idea type attribute of the document;

a first metric indicate a percentage of shared ideas between the author and the reader; and a second metric indicate a percentage of reasons already believed by the reader;

wherein the reader feedback comprises a first state or a second state, the first state indicate that the reader believes the content of the supporting idea type attribute in the document, the second state indicating that the reader does not believe the content of the supporting idea type attribute in the document, and wherein the instructions further configure the apparatus to:

update the first or second metric based on the first or second state of the reader feedback from the reader of the document.

10. The computing apparatus of claim 9, wherein the instructions further configure the apparatus to: update the first metric or the second metric in response to receiving the reader feedback from the reader of the document, wherein the updated profile of the reader indicates that the reader validates an idea set forth in the document, and generate a suggestion of the document in a feed of another reader related to the reader in response to the reader validating the idea set forth in the document.

11. The computing apparatus of claim 9, wherein the instructions further configure the apparatus to:

determine a number of common documents indicated as believed by both the reader and the author;

determine a total number of documents indicated as believed by both the reader and the author; and compute the first metric based on a ratio of the number of common documents by the total number of documents.

12. The computing apparatus of claim 11, wherein the instructions further configure the apparatus to:

identify the common documents; and present a list of the common documents in the display.

13. The computing apparatus of claim 9, wherein the instructions further configure the apparatus to:

determine a number of believed content of the supporting idea type attribute by the reader;

determine a number of content of the supporting idea type attribute in the document; and compute the second metric based on a ratio of the number of believed content of the supporting idea type attribute by the reader by the number of content of the supporting idea type attribute in the document.

14. The computing apparatus of claim 9, wherein receiving the reader feedback of the document further comprises:

receive a supporting content feedback associated with content of the supporting idea type attribute in the document; and update the second metric in response to receiving a supporting content feedback associated with content of the supporting idea type attribute in the document.

15. The computing apparatus of claim 9, wherein the instructions further configure the apparatus to:
identify other documents based on the first and second metric; and
present a suggestion of one or more of the other documents in the display, wherein the taxonomy rules comprise content rules that map the supporting idea type attribute to the idea type attribute, wherein the value of the idea type attribute comprises one of a content, a belief system, an opinion, a principle, a fact, a meaning, a personal experience, or a hypothetical example, and wherein the value of the supporting idea type attribute comprises one of an opinion, a principle, a fact, a meaning, a personal experience, a hypothetical example, or a fundamental belief.

16. A non-transitory computer-readable storage medium, the computer-readable storage medium including instructions that when executed by a computer, cause the computer to perform operations comprising:
cause a display of a document that is formed based on a tree structure from a structured document template with an idea type attribute and content of a supporting idea type attribute that is based on the idea type attribute, the idea type attribute and the content of the supporting idea type attribute validated based on taxonomy rules for the structured document template;
receive a reader feedback of the document via a feedback user interface of the display; and
update a profile of a reader of the document and a profile of an author of the document based on the reader feedback;
wherein the display of the document further comprises:
an identification of the author of the document;
an identification of the idea type attribute of the document;
a first metric indicate a percentage of shared ideas between the author and the reader; and
a second metric indicate a percentage of reasons already believed by the reader;
wherein the reader feedback comprises a first state or a second state, the first state indicate that the reader believes the content of the supporting idea type attribute in the document, the second state indicating that the reader does not believe the content of the supporting idea type attribute in the document, and
wherein the instructions further cause the computer to perform an operation comprising:
update the first or second metric based on the first or second state of the reader feedback from the reader of the document.

* * * * *